US008028059B1

(12) United States Patent
O'Laughlen et al.

(10) Patent No.: US 8,028,059 B1
(45) Date of Patent: Sep. 27, 2011

(54) PAGE VIEWS FOR PROXY SERVERS

(75) Inventors: Eric O'Laughlen, Aldie, VA (US); W. Karl Renner, Great Falls, VA (US); Kevin E. Greene, Arlington, VA (US)

(73) Assignee: AOL Inc., Dulles, VA (US)

( * ) Notice: Subject to any disclaimer, the term of this patent is extended or adjusted under 35 U.S.C. 154(b) by 245 days.

(21) Appl. No.: 11/321,043

(22) Filed: Dec. 30, 2005

Related U.S. Application Data

(63) Continuation-in-part of application No. 10/858,394, filed on Jun. 2, 2004, which is a continuation-in-part of application No. 10/747,265, filed on Dec. 30, 2003.

(60) Provisional application No. 60/474,623, filed on Jun. 2, 2003.

(51) Int. Cl.
*G06F 15/173* (2006.01)

(52) U.S. Cl. .......................... 709/224; 709/223; 709/225

(58) Field of Classification Search .......... 709/223–225, 709/203, 206
See application file for complete search history.

(56) References Cited

U.S. PATENT DOCUMENTS

| 5,678,041 | A |   | 10/1997 | Baker et al. |         |
|-----------|---|---|---------|--------------|---------|
| 5,712,979 | A | * | 1/1998  | Graber et al.| 709/224 |
| 5,960,429 | A | * | 9/1999  | Peercy et al.| 709/217 |
| 6,018,619 | A | * | 1/2000  | Allard et al.| 709/224 |
| 6,052,730 | A | * | 4/2000  | Felciano et al.| 709/225 |
| 6,167,448 | A | * | 12/2000 | Hemphill et al.| 709/224 |
| 6,278,966 | B1| * | 8/2001  | Howard et al.| 703/23  |
| 6,311,215 | B1| * | 10/2001 | Bakshi et al.| 709/221 |
| 6,446,128 | B1| * | 9/2002  | Woods et al. | 709/229 |
| 6,564,327 | B1| * | 5/2003  | Klensin et al.| 726/7  |

(Continued)

FOREIGN PATENT DOCUMENTS

EP 0801487 10/1997

(Continued)

OTHER PUBLICATIONS

Reiter, M.K., Anupam, V., and Mayer, A."Detecting hit-shaving in click-through payment schemes". In Proceedings of the 3rd USENIX Workshop on Electronic Commerce. (Aug. 1998), 155-166. [retrieved from the "Internet http://www.usenix.org/event/ec98/full_papers/reiter/reiter.pdf" on Aug. 23, 2009].*

(Continued)

*Primary Examiner* — Philip Chea
*Assistant Examiner* — Lashanya Nash
(74) *Attorney, Agent, or Firm* — Finnegan, Henderson, Farabow, Garrett & Dunner, LLP

(57) ABSTRACT

Distinctions between resources explicitly selected by a user and resources indirectly selected may be enabled by identifying an explicitly selected web page or other resource as such in the request for the web page or other resource, which may allow the web page or resource to be differentiated from web pages or other resources that are requested as a consequence of their indirect selection. Moreover, a log of web pages or other resources explicitly selected by a user may be maintained at the client and later reference by a local processor or communicated to a host process seeking to differentiate directly and indirectly selected web pages or other resources. These techniques also may allow a proxy or other server to perform processing related to parentally controlled accounts or related to accurately tracking frequently requested resources such as web pages.

18 Claims, 14 Drawing Sheets

U.S. PATENT DOCUMENTS

| | | | |
|---|---|---|---|
| 6,745,367 B1 * | 6/2004 | Bates et al. | 715/205 |
| 6,795,856 B1 | 9/2004 | Bunch | |
| 6,917,968 B2 * | 7/2005 | Nakamura | 709/217 |
| 7,047,294 B2 * | 5/2006 | Johnson et al. | 709/224 |
| 2002/0049806 A1 | 4/2002 | Gatz et al. | |
| 2003/0051157 A1 | 3/2003 | Nguyen et al. | |
| 2003/0061360 A1 | 3/2003 | Chow et al. | |
| 2003/0065743 A1 * | 4/2003 | Jenny et al. | 709/219 |
| 2003/0195971 A1 | 10/2003 | Lai | |
| 2004/0006621 A1 | 1/2004 | Bellinson et al. | |
| 2007/0271375 A1 | 11/2007 | Hwang | |

FOREIGN PATENT DOCUMENTS

| | | |
|---|---|---|
| JP | 11175471 | 2/1999 |

OTHER PUBLICATIONS

International Search Report, dated Nov. 23, 2004 for International Application No. PCT/US04/17319, filed Jun. 2, 2004.

Written Opinion, dated Nov. 23, 2004 for International Application No. PCT/US04/17319, filed Jun. 2, 2004.

RFC 2616, Section 14.36, Jun. 1999, available at http://www.ietf.org/rfc/rfc2616.txt.

Search Report for European Patent Application No. EP 04 75 4024 dated Jun. 23, 2006.

"What are Cookies?", N.A., Mar. 12, 1998, XP002145971 * p. 2 *.

Scott Mitchell: "The Lowdown on Cookies" N.A., Nov. 2, 1999, XP002254885. * the whole document *.

European Office Action issued in EP Application No. 04 754 024.0-2201, mailed Jun. 18, 2008, 8 pages.

Lee J. et al: "Visualization and Analysis of Clickstream Data of Online Stores for Understanding Web Merchandising" Internet Citation, [Online] Jan. 1, 2000, XP002208026 Retrieved from the Internet: URL:http://www.research.ibm.com/iac/tech-paper.html> [retrieved on Jul. 30, 2002] section 1.

Anonymous: "Module mod_rewrite URL Rewriting Engine" Internet Citation, [Online] Feb. 25, 2001, XP002306765 Retrieved from the Internet: URL:http://web.archive.org/web/20010225031737/http://httpd.apache.org/docs-2.0/mod/mod_rewrite.html>[retrieved on Nov. 22, 2004] *the whole document*.

* cited by examiner

```
<table width="770" cellpadding="0" cellspacing="0" border="0" bgcolor="#ffffff">
<tr>
<td width="202" rowspan="3" valign="bottom">
<a href="/"><img src="http://i.a.cnn.net/cnn/.element/img/1.1/logo/logo.gif"></a></td>
```

FIG. 2B

```
<HTML>
<HEAD>
<TITLE>A simple frameset document</TITLE>
</HEAD>
<FRAMESET cols="20%, 80%">
        <FRAMESET rows="100, 200">
                <FRAME src="contents_of_frame1.html">
                <FRAME src="contents_of_frame2.gif">
        </FRAMESET>
        <FRAME name="frame3" src="contents_of_frame3.html">
</FRAMESET>
</HTML>
```

PAGE VIEWS FOR PROXY SERVERS

CLAIM OF PRIORITY

This application is a continuation-in-part of U.S. patent application Ser. No. 10/858,394, filed on Jun. 2, 2004, which is a continuation-in-part of U.S. patent application Ser. No. 10/747,265, filed on Dec. 30, 2003, which claims priority under 35 USC §119(e) to U.S. Provisional Patent Application Ser. No. 60/474,623, filed on Jun. 2, 2003. All of these applications are hereby incorporated by reference.

TECHNICAL FIELD

This description relates to proxy server processing.

BACKGROUND

Client computers can communicate with a server to remotely access information stored at the server. The transfer of information between the server and client computers may be provided by observing standard protocols and using software applications. For example, a hypertext markup language (HTML) browser application at a client computer can communicate over the public Internet using standard communication protocols, such as Transfer Control Protocol/Internet Protocol (TCP/IP) and hypertext transfer protocols (HTTP), to retrieve resources such as web pages or objects from a HTTP server. Web pages may include formatted text as well as objects, such as multimedia elements including, for example, embedded graphics, sounds, and/or video. Exemplary browser applications include Netscape Navigator and Microsoft Internet Explorer.

The America Online (AOL) client is an example of a proprietary browser application. The AOL client executes on a client computer connected to the AOL network. To receive web pages from servers on the AOL network, the AOL client communicates with servers on the AOL network using proprietary communication protocols. When the AOL client seeks to receive web pages available on HTTP servers located on the public Internet, the AOL client communicates with a proxy server on the AOL network. The proxy server then communicates with HTTP servers on the public Internet using standard communication protocols, such as TCP/IP and HTTP, to receive the web pages from the HTTP servers. The web pages received from HTTP servers may be written in a standard language such as HTML, while the AOL client renders web pages written in a proprietary language. Thus, once received, the proxy server translates the web pages, as necessary, into the proprietary language and forwards the translated web pages to the AOL client.

The HTTP specification provides for an HTTP header known as the Referer Header that is intended to reveal the identity of a resource used to call each object included on a displayed web page. More precisely, the HTTP Referer Header specifies "the address [a Uniform Resource Identifier] (URI) of the resource from which the Request-URI was obtained." See "HyperText Transfer Protocol—HTTP/1.1," RFC 2616, http://www.w3.org/Protocols/rfc2616/rfc2616.html. An example of the HTTP Referer Header is shown during the processes undertaken when a user navigates to www.aol.com. The rendering of the aol.com web page causes the browser to obtain a number of other objects such as graphics. For each of the items being retrieved the HTTP Referrer Header indicates a referring page. For instance, a trace shows the following during the rendering of one of the objects embedded within www.aol.com:

Uniform Resource Locator (URL):http://m2.doubleclick.net/viewad/698862/roommates180×75.gif
Headers:
Referer:http://ad.doubleclick.net/adi/N2885.AOLcom/B910031.25; sz=180×75; ord=[timestamp]?
Accept-Language: en-us Interestingly, even though it is the rendering of the aol.com webpage that is initially triggering retrieval of the embedded object, the referrer header identifies a resource other then aol.com. Specifically, the HTTP Referer Header indentifies "ad.doubleclick.net/adi/N2885.AOLcom/B910031.25; sz=180×75; ord=[timestamp]?" as the referring resource.

Generally, the failure of the HTTP Referer Header to identify aol.com results from multiple levels of indirection or redirection needed to ultimately load the embedded objects and the design of the HTTP Referer Header to identify the "lowest" level of redirection rather then the "highest" level of redirection. More particularly, the HTTP specification requires the HTTP Referer Header to indicate the resource from which the requested URL was directly obtained. In keeping with the earlier example, the above trace reveals that the following destination was called prior to calling the embedded object, likely because of an URL embedded within aol.com that specified this destination and resulted on the following request:

URL:http://ad.doubleclick.net/adi/N2885.AOLcom/B910031.25; sz=180×75; ord=[timestamp]?
Headers:
Referer: http://www.aol.com/
Accept-Language: en-us As can be seen, the resource identified in the HTTP referrer header for the request initially shown above (i.e., http://ad.doubleclick.net . . . ) was retrieved before that first request was sent. And, that resource redirected or otherwise instructed the browser to retrieve the resource at http://m2.doubleclick.net/viewad/698862/roommates180×75.gif. Therefore, the http://ad.doubleclick.net . . . resource is the resource from which the embedded http://m2.doubleclick.net . . . resource was obtained, causing the HTTP Referer Header to identify http://ad.doubleclick.net . . . rather than www.aol.com, which is the URL for the web page whose rendering triggered the embedded resource to be retrieved.

Notably, implementations of the HTTP referrer handles frame pages by including the URL of the web page loaded into a frame, rather than the URL of the frame page.

SUMMARY

In one aspect, a detection is made as to whether a user has explicitly requested a first resource, and a request for a first resource is generated. When a user has explicitly requested the first resource, an indication is included in the request. The indication indicates that that the user explicitly requested the first resource. The request is sent to a server computer and the first resource is received from the server computer. The first resource is rendered, which includes generating a request for a second resource and sending the request for the second resource. The request for the second resource does not include an indication that the user explicitly requested the second resource; and Implementations of this aspect may include one or more of the following features. For example, the server computer may be a proxy server. A request for a third resource may be generated, and the request for the third resource may include an indication that the user explicitly requested the third resource. The third request may be sent to a server computer, and the third resource may be received and rendered.

The detection may include detecting that the user has clicked on a hyperlink or that the user has typed a location of the first resource into a navigation bar of a browser. The first resource may be a web page and the request for the first resource may be an HTTP request. The indication may be a header such that generating a request for the first resource includes inserting a header into the request for the first resource. The header may be an HTTP header.

In another aspect, a request is received from a client system for a first resource requested by a user. The request includes an indication that the user explicitly requested the first resource. The first resource is sent to the client system. A request for a second resource is received while the client system is rendering the first resource. The request for the second resource does not include an indication that the user explicitly requested the second resource. The second resource is sent to the client system.

Implementations of this aspect may include one or more of the following features. For example, processing related to access controls may be performed based on the indication that the user explicitly requested the first resource included in the request for the first resource. The access controls may relate to a parental control service. The processing may included including an identification of the first resource in a report to a parental account because the request for the first resource includes the indication that the user explicitly requested the first resource. The processing additionally, or alternatively, may include excluding an identifier for the second resource in the report to the parental account because the request for the second resource does not include an indication that the user explicitly requested the second resource.

Additionally, or alternatively, processing related to tracking frequently requested resources may be performed based on the indication that the user explicitly requested the first resource included in the request for the first resource. The processing may include including the first resource in a count of requested resources because the request for the first resource includes the indication that the user explicitly requested the first resource. Additionally, or alternatively, the processing may include excluding the second resource from the count of requested resources because the request for the second resource does not include the indication that the user explicitly requested the second resource.

The first resource is a web page and the request for the first resource is an HTTP request. The indication that the user explicitly requested the first resource may include a header such that generating a request for the first resource includes inserting a header into the request for the first resource. The header may be an HTTP header.

In another aspect, a request is received from a client system for a first resource explicitly requested by a user of the client system and the first resource is sent to the client system. A communication is received from the client system separately from the request for the first resource. The communication identifies the first resource as a resource explicitly request by the user of the client system. Processing related to at least one of access controls or tracking frequently requested resources is performed based on the communication.

Implementations of this aspect may include one or more of the following features. For example, The first resource may be a web page and the request for the first resource may be an HTTP request. Processing related to access controls may include including an identification of the first resource in a report to a parental account because the communication identified the first resource as a resource explicitly request by the user of the client system. Additionally, or alternatively, processing related to access controls may include excluding an identifier for a second resource in the report to the parental account if a communication identifying the second resource as a resource explicitly requested by the user of the client system was not received from the client system.

Processing related to tracking frequently requested resources may include including the first resource in a count of requested resources because the communication identified the first resource as a resource explicitly request by the user of the client system. Additionally, or alternatively, processing related to tracking frequently requested resources may include excluding a second resource from the count of requested resources if a communication identifying the second resource as a resource explicitly requested by the user of the client system was not received from the client system.

DESCRIPTION OF DRAWINGS

FIG. 2B is a portion of the source code for the web page shown in FIG. 2A.

DETAILED DESCRIPTION

Figure 1:
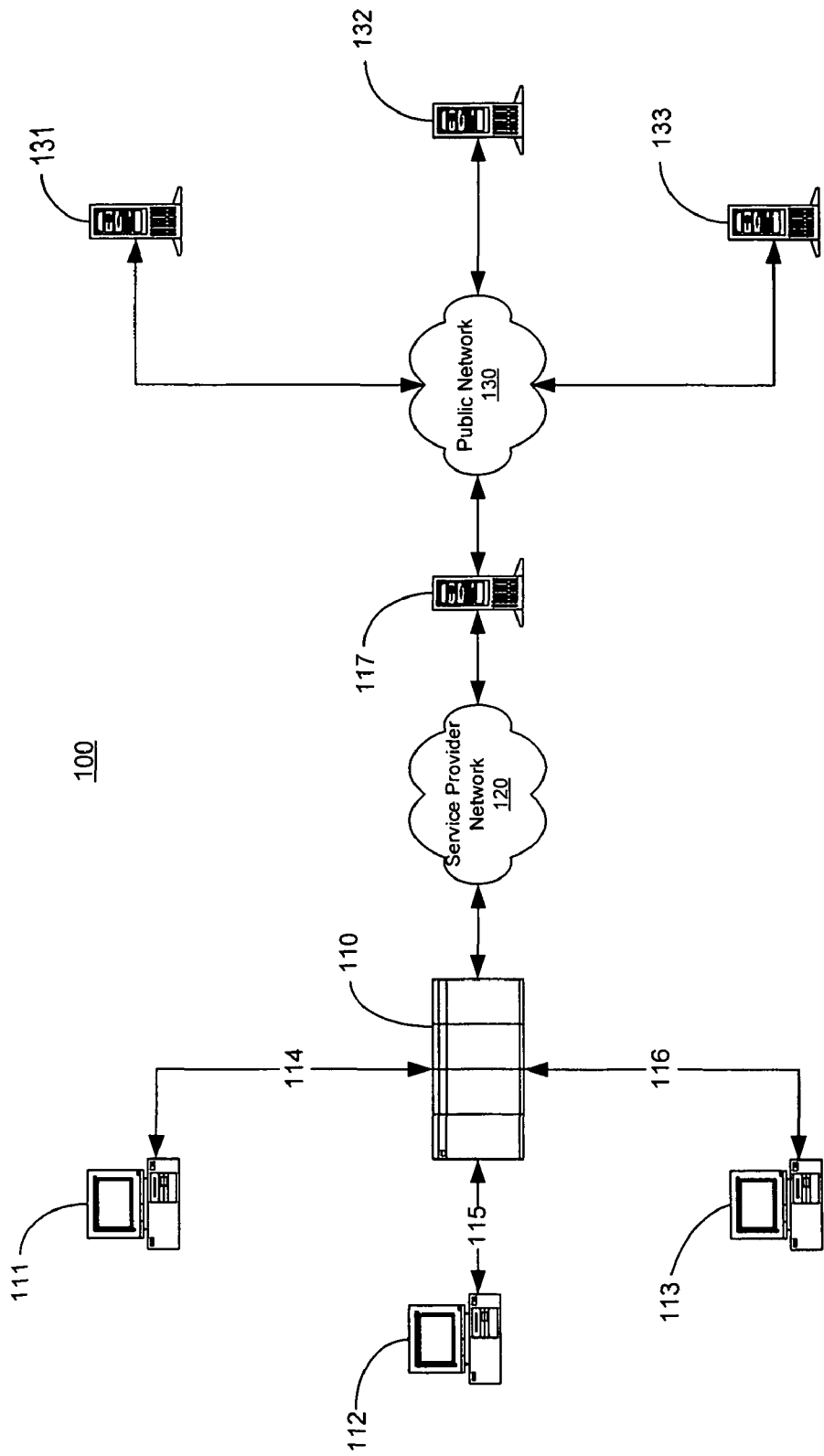
FIG. 1 is a diagram showing a network that includes server computers and client computers.

Generally, a page view field is included in a request for a resource (e.g., an HTTP request for an URL). The page view field includes a header and data that indicates the URL identifier for the web page or other document used to trigger the request for the resource (either directly or indirectly). A browser may add the page view field to a request whenever the requested resource is obtained from within a web page or other document displayed by the browser, e.g., embedded objects.

Certain processes may be used to help insure that the URL included in the page view field is the URL of the web page or other document that initially triggered a request (i.e., the web page or other document from which the requested URL was obtained, either directly or indirectly). In such processes, the URL requested for new navigations by the user (e.g., when the user types the URL into a navigation bar of a browser or clicks on a hyperlink) is stored as a Main Page URL as long as the new navigation is not a frame navigation. This stored Main Page URL is appended to or otherwise included in subsequent requests that are not new navigations or frame navigations. Once a new navigation occurs that is not a frame navigation, the new URL requested as a result of the navigation is then stored as the Main Page URL and is appended to or otherwise included in subsequent requests that are not new navigations or are frame navigations.

In this manner, items embedded within a web page and called during the reading of that web page are identifiable as such, and made distinguishable from other items that are otherwise called. Moreover, this approach enables distinction among resources that are triggered by users and web page calls, even if both result in population of the HTTP Referer Header. For example, with reference to the example provided in the background section, the page view field would help distinguish a call to www.aol.com that resulted from user navigation to that site from a call to www.aol.com that results from rendering of another page that merely embeds a call to www.aol.com. Significantly, the HTTP Referer Header may not be useful for similar purpose since the content rendered at www.aol.com may result from a redirect in either case. Moreover, this ability to make this distinction is useful in understanding and/or controlling the intentional browsing activities of one or more users.

The page view field may be used by a proxy or other server to perform processing related to a number of applications. The processing may relate to access controls, e.g., parentally controlled accounts. For example, the applications may include the reporting of URLs visited by parentally controlled accounts; or allowing parentally controlled accounts to access lower level web pages of web pages the account has been given permission to access. Also, the processing may relate to accurately tracking frequently requested resources such as web pages.

Alternatively, or additionally, such distinctions between resources explicitly or directly selected by a user and resources indirectly selected may be enabled by identifying an explicitly selected web page or other resource as such in the request for the web page or other resource, which may allow the web page or resource to be differentiated from web pages or other resources that are requested as a consequence of their indirect selection (e.g., by being requested as a result of a resource explicitly requested by a user). Moreover, a log of web pages or other resources explicitly selected by a user may be maintained at the client and later reference by a local processor or communicated to a host process seeking to differentiate directly and indirectly selected web pages or other resources. Such communications may be made in a communication separate from requests for resources. These techniques also may allow a proxy or other server to perform processing related to parentally controlled accounts or related to accurately tracking frequently requested resources such as web pages.

FIG. 1 shows a network 100 that includes server computers 131-133 and client computers 111-113. Server computers 131-133 may execute hypertext transfer protocol (HTTP) server software to respond to data requests from HTTP-based web browsers executing at client computers 111-113. Client computers 111-113 can send HTTP data requests to servers 131-133 over data paths that include access connections 114-116, a service provider's point of presence (POP) 110, network 120, proxy server 117, and a public network 130. The HTTP data requests can target various types of resources such as documents (e.g., web pages) or objects (e.g., executable files, audio files, or video files). The service provider's POP 110 includes data communications equipment that enables and regulates communication between client computers 111-113 and the service provider's network 120. For example, POP 110 may include dial-up modem banks, cable modem banks, wireless communications equipment, or other data transmission equipment.

Access to a service provider's POP 110 may be restricted to certain users of the client computers 111-113. To enforce access restrictions, POP 110 may implement security and authentication mechanisms such as login verification. A login verification mechanism may require a user to input a valid user name and password to obtain access to the service provider's network 120. If the user name and password are invalid, the user may be disconnected. Security and authentication mechanisms also may be implemented at a separate login server (not shown) connected to the service provider's network 120 and/or POP 110.

After a valid connection has been established between a client computer and POP 110, data may be exchanged between software applications running on the client computer, and applications running on other computers on the service provider's network 120. The service provider's network 120 may be interconnected with another network 130 by a proxy server 117 that can exchange data between the service provider's network 120 and computers on another network 130.

Proxy server 117 can function as a surrogate for another computer. For example, proxy server 117 may receive HTTP data requests directed to HTTP server software at one of the server computers 131-133 from a browser application at client computer 111. When the proxy server 117 receives a data request, it may attempt to fulfill the data request using data stored at a local database or hard disk (not shown). If the proxy server 117 has the needed data, the data can be returned to the client computer 111 without requiring further interaction with servers 131-133. If the proxy server 117 is unable to fulfill the request, it may forward the request to the appropriate one of the servers 131-133, receive a response from that server, and send the response to the client computer 111. Proxy server 117 may perform some processing on the response before sending it to client computer 111.

The proxy server 117 also may store response data on a hard disk drive or local database for future use. Networks 120 and 130 also may be interconnected by a gateway, bridge, router, or other interconnection device instead of, or in addition to, proxy server 117.

While the foregoing has described the various components of network 100 as using the HTTP protocol, other standard or proprietary communication protocols may alternatively be used. In another implementation, for example, proprietary browsing software may execute on client computers 111-113 and may communicate with other computers (including proxy computer 117) on service provider network 120 using proprietary protocols, or a mix of standard and proprietary protocols. Proxy server 117 interfaces service provider network with public network 130 by translating requests and responses from the proprietary protocol into the standard protocols. Additionally, if the browser executing on client computer 111 only renders web pages written in a proprietary language and a web page written in a standard language is retrieved from a server 131-133, proxy server 117 may convert the standard language web page into a proprietary language web page.

Thus, in this exemplary implementation, client computers 111-113 execute the proprietary browsing software and communicate with proxy server 117 using the proprietary communications protocol. Proxy server 117 then communicates with servers 131-133 using the standard protocol to receive the requested web page. Proxy server 117 translates the web page as necessary and forwards the web page to the appropriate one of the client computers 111-113 using the proprietary communications protocol.

In other implementations, public network 130 may use other standard or proprietary communication protocols and web pages may be written in other standard or proprietary languages. In general, the standard or proprietary protocol or language used on public network 130 may be the same or different than the standard or proprietary protocol or language used on service provider network 120.

Figure 2A:
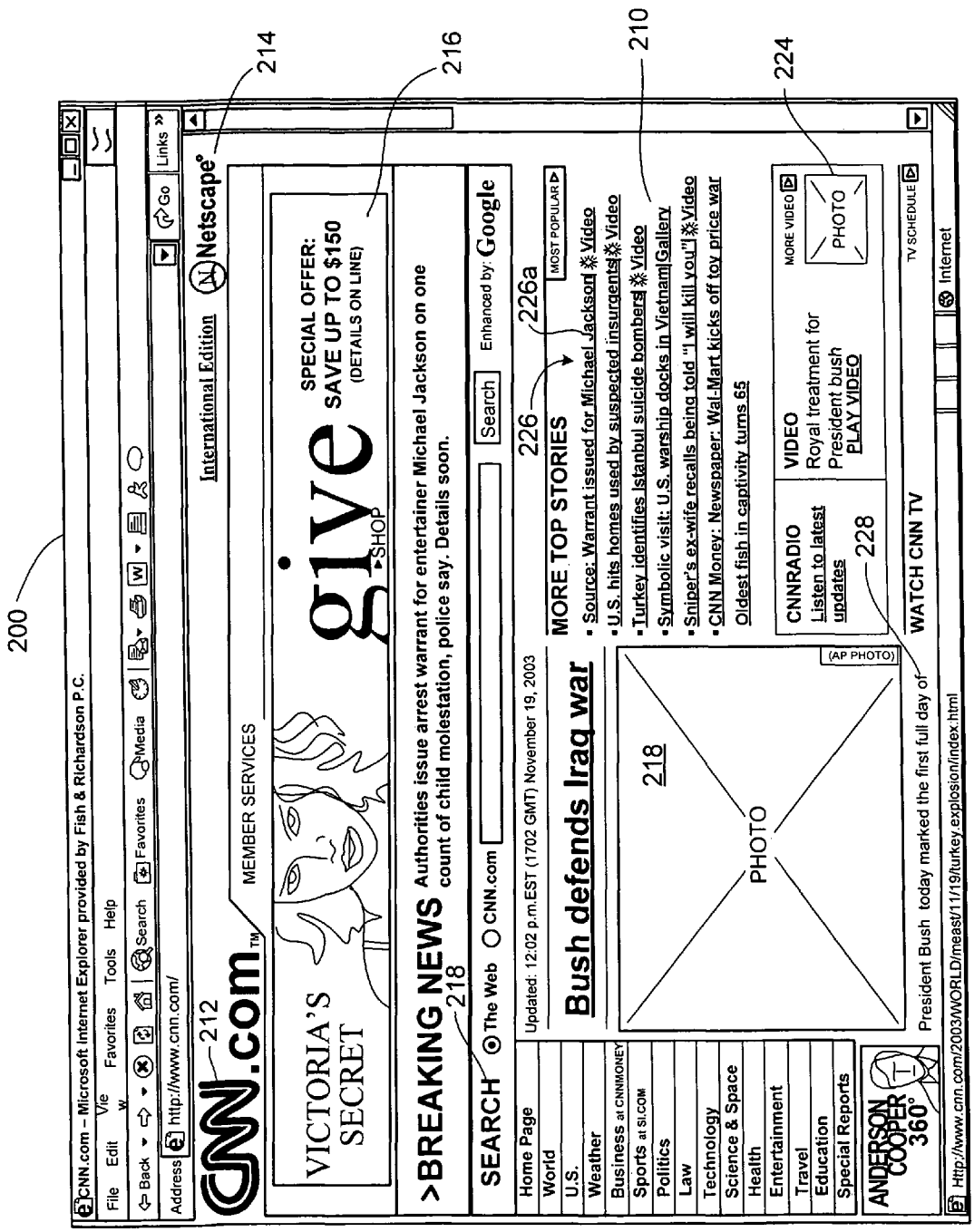
FIG. 2A is an illustration showing a web browser and displayed web page.

FIG. 2A shows a web browser 200 display of a web page 210. The term web page as used herein refers generally to documents displayed by a browser, whether those documents are written in a standard or proprietary language.

Web page 210 is the default web page for the domain www.cnn.com. After proxy server 117 has sent web page 210 to, e.g., client computer 111 (either from the proxy server's local hard drive or database or from a server 131-133), web browser 200 renders the web page 210 so that a user of client computer 111 can view it. Web page 210 is composed of text, hyperlinks and a number of objects such as embedded graphics. For example, web page 210 includes graphics 212-224, hyperlinks 226, and text 228. While not shown, the objects can also include, for example, audio files, video files, executable files, or other resources.

Web pages are typically text files written in a standard or proprietary language that is understood by browser 200. Some standard languages include HTML and the extended mark-up language (XML). The text file (otherwise referred to as the web page source code) constitutes instructions to the web browser 200 as to what the browser should display when it renders the web page. The web browser 200 processes the source code (e.g., a HTML text document) and renders the web page 210 to the user accordingly.

Because web pages are normally text files, they typically contain text and hyperlinks. By contrast, graphics typically need to be retrieved when browser 200 renders a web page. The web page source code includes instructions that direct browser 200 to the location of the graphics to be loaded (typically located on the server that provided the web page source code). Browser 200 uses the instructions to retrieve the graphics when browser 200 renders the web page.

FIG. 2B shows a portion of source code 230 that corresponds to web page 210. The source code for web page 210 is written in HTML. HTML consists of text "tags" that provide browser 200 with certain information and instruct the browser 200 how to display that information. A tag is text surrounded by the brackets "<>." In the example provided by source code 230, tags 232-236 primarily instruct browser 200 as to where browser 200 is to display graphic 212. Tags 238a and 238b instruct browser 200 to display graphic 212 and to hyperlink the graphic 212 to a particular web page (in this case, graphic 212 is hyperlinked to web page 210). The anchor tag 238a, <a>, instructs the browser to create the hyperlink. The image tag 238b, <img>, instructs the browser to insert graphic 212. Image tag 238b includes the location of graphic 212 as an argument. The location of the graphic 212 is expressed as a Uniform Resource Locator (URL) 240.

URL 240 includes several sections that identify the location of graphic 212. A first section 242 indicates that graphic 212 is located at a server whose domain name is "i.a.cnn.net." First section 242 also indicates that graphic 212 is available at the server via the HTTP protocol. A second section 244 indicates the directory location of graphic 212 on the server. A third section 246 indicates the filename of graphic 212, namely, "logo.gif."

Using the URL 240 and the domain name system (DNS), web browser 200 can determine the address of the server computer (e.g., server computer 131) that stores graphic 212, along with the location of graphic 212 on the server computer 131. With this information, web browser 200 can retrieve graphic 212 from server computer 131 and display graphic 212 appropriately.

More specifically, when browser 200 is rendering web page 210, browser 200 processes image tag 238b by first contacting a DNS server (not shown) to obtain the address of the server whose domain name is "i.a.cnn.net" (e.g., server computer 131). Next, browser 200 causes client computer 111 to send a request for graphic 212 to server computer 131, which is first received by proxy server 117. Proxy server 117 may perform some processing as a result of receiving the request (further described below). Proxy server 117 then forwards the request for graphic 212 to the server computer 131, receives graphic 212 from server computer 131, and forwards graphic 212 back to client computer 111 so that browser 200 can display graphic 212.

Other implementations of the steps used to obtain web pages or other information from servers 131-133 are possible, and may depend on the particular protocols used by client computers 111-113, proxy server 117, and severs 131-133.

Figure 3A:
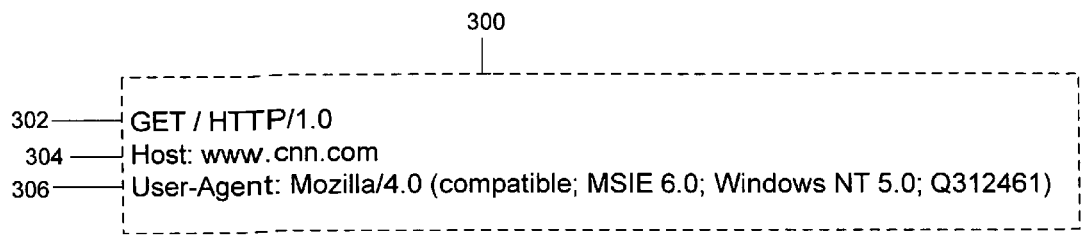
FIGS. 3A-3C show various HTTP requests related to the web page shown in FIG. 2A.

FIG. 3A shows an HTTP request 300. In an HTTP implementation, an HTTP request 300 is sent by client computer 111 to proxy server 117. HTTP request 300 includes a structured sequence of fields 302-306. Each field 302-306 includes an HTTP header and data associated with the header. For example, field 302 includes the header "GET," which indicates that the HTTP request is a "GET" request to obtain a default web page located at the top-level of the directory structure (indicated by data "/") at the server. In field 304, header "Host:" indicates the server computer from which the default web page is to be obtained. In request 300, the server is the server whose domain is "www.cnn.com." Field 306 includes the HTTP header "User-Agent:." The data of field 306 is "Mozilla/4.0 (compatible; MSIE 6.0; Windows NT 5.0; Q312461)," which designates the type of browser generating the request 300.

Figure 3B:
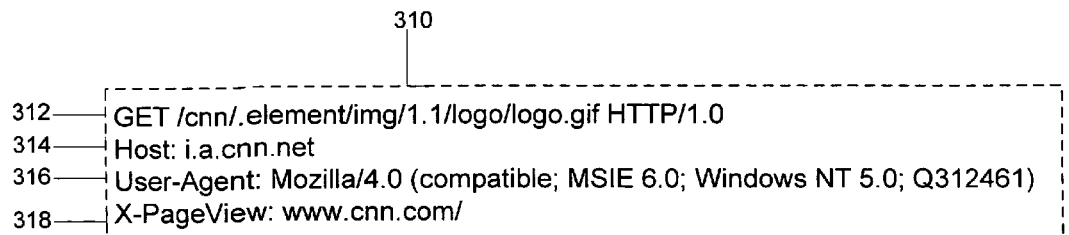
Figure 3C:
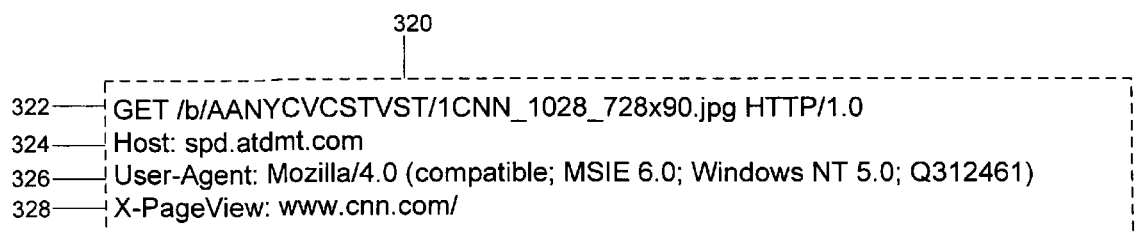

In addition, HTTP requests are sent to proxy server 117 to retrieve the objects, such as graphics 212-224, included in web page 210 when the browser renders the web page. For example, FIGS. 3B and 3C show the HTTP requests 310 and 320 for graphics 212 and 216, respectively. Request 310 has fields 312-318 and request 320 has fields 322-326. Fields 312-316 and 322-326 are similar to fields 302-306 of request 300. For example, field 312 indicates that the request is a GET request to obtain graphic 212 and includes the filename and location of graphic 212 on the server, namely, "/cnn/.element/img/1.1/logo/logo.gif." Field 314 indicates the graphic 212 is located on the server whose' domain name is "i.a.cnn.net" and field 316 indicates the type of browser making the request.

Each of requests 310 and 320 also include an additional field 318 and 328 (the page view field), respectively. This field includes a header and data that indicates the URL for the web page or other document from which the requested URL was obtained. For example, in request 310, field 318 includes the header "X-PageView:" that has as its data "www.cnn.com/."

The data is "www.cnn.com/" because requested URL 240 (which points to graphic 212) was obtained from the default web page 210 on www.cnn.com and the default web page 210 for www.cnn.com has the URL "www.cnn.com/." Browser 200 obtained requested URL 240 for graphic 212 from this default web page 210 when the browser 200 was rendering web page 210. Similarly, field 328 includes the header "X-PageView:" that has as its data "www.cnn.com/."

As can be seen by comparing requests 310 and 320, some objects on web pages are not from the same servers, or even from the same domain. For example, referring to fields 314 and 326, graphic 212 is located on the server with the domain "i.a.cnn.net," while the graphic 216 is located on the server with the domain "spd.atdmt.com."

As described above, HTTP requests 300, 310 and, 320 may be sent from a client computer 111 to proxy 117 and forwarded through the proxy 117 for delivery to a server computer 131. As further described below, the page view field in requests 310 and 320 allow proxy server 117 to perform processing based on a page view (as described below) of a web page 210 as an alternative, or in addition to, an object view of the web page, as opposed to simply being able to perform processing on an object view.

Figure 4A:
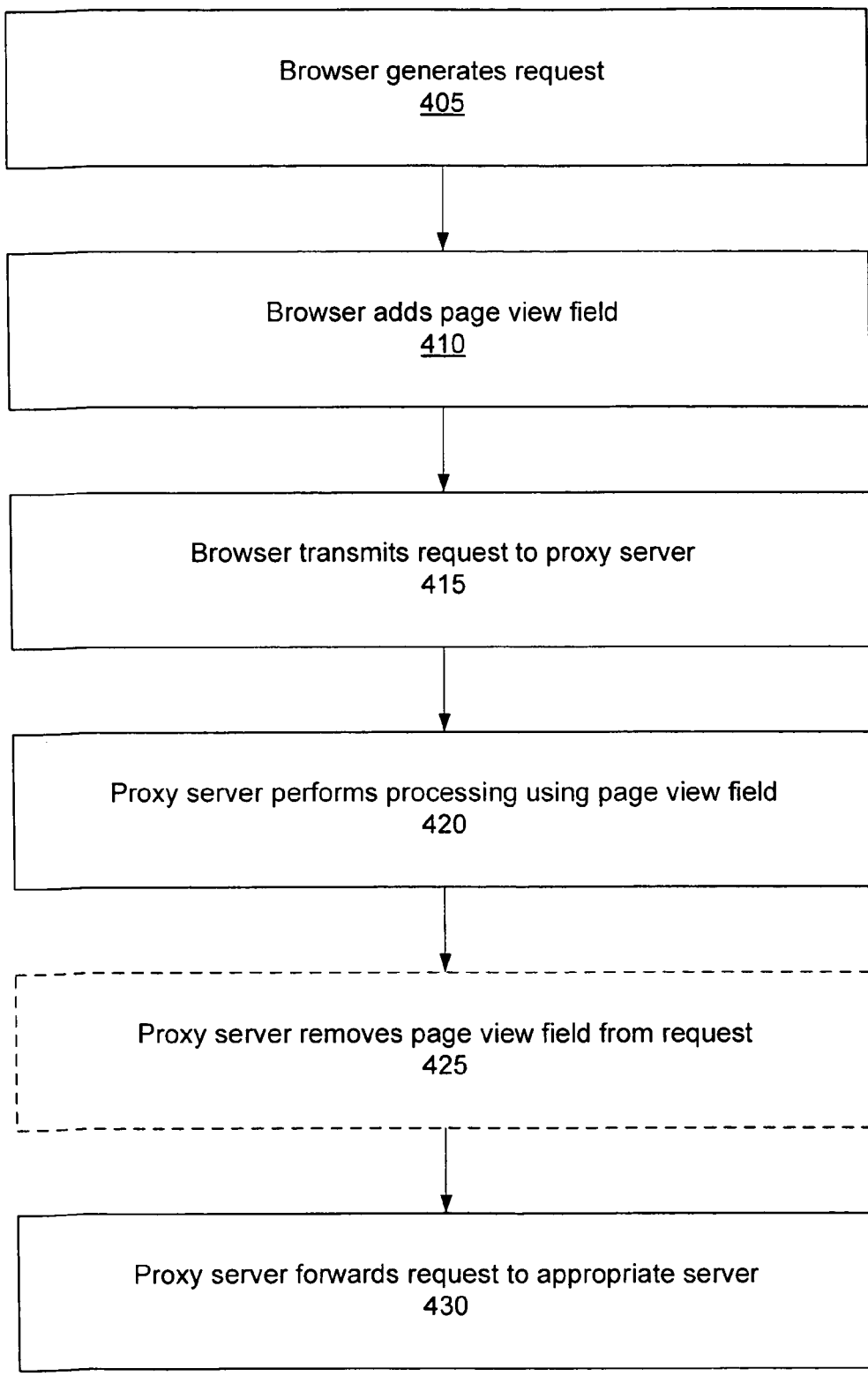
FIG. 4A is a flowchart showing a process that occurs when a web browser requests a web page.

Referring to FIG. 4A, when a page view field is used, web browser 200 generates a request (405) and adds the page view field to the request (410), if appropriate. Browser 200 typically adds the page view field whenever the URL for the information being requested is obtained from within a web page or other document displayed in browser 200. Thus, for example, the page view field is added when the browser is rendering a web page and needs to retrieve an object for display in the page, or, for example, when a user selects a hyperlink in a web page.

The URL for the information being requested may be obtained directly from within the web page or other document being displayed, or indirectly, for example, as a result of a HTTP redirect. For instance, a URL in a web page may point to a redirecting resource that returns the URL to a graphic that is to be displayed in the web page. Browser 200 may track that the URL to the graphic is obtained (although indirectly) from the URL in the web page. Browser 200 then includes the URL for the web page in the page view field that is part of the request for the graphic, instead of the URL to the redirecting resource from which the URL for the graphic was directly obtained.

The request then is transmitted to proxy server 117 (415), which performs processing using the page view field (420). The page view field allows proxy server 117 to have a page view of the requests received by proxy server 117, thus providing proxy server 117 with information about the existence (or lack thereof) and location/identification of a web page containing the requested URL. This allows proxy server 117 to perform processing based on the fact that the requested URL (or object pointed to by the requested URL) is part of a web page and which web page the requested URL (or object pointed to by the requested URL) is a part of. Proxy server 117 also may perform processing based on the object view of the requests. An object view refers to the information that the proxy server has about the URL itself or information about the object itself pointed to by the URL, without regard to the relationship between the URL or object and other web pages.

The proxy server processing may relate to a number of different applications. As described below, the processing may relate to parentally controlled accounts. For example, the applications may include the reporting of URLs visited by parentally controlled accounts; or allowing parentally controlled accounts to access lower level web pages of web pages the account has been given permission to access. Also as described below, the processing may relate to accurately tracking frequently requested resources such as web pages.

Proxy server 117 optionally removes the page view field from the request (425) if it is included, and forwards the request to the appropriate server computer 131-133 (430).

Because the page view field is not a standard field, servers do not use this field, and therefore, removing it does not effect server processing of the request. The appropriate server computer 131-133 processes the request, as normal, and returns a reply to proxy server 117, which forwards the reply to the appropriate client computer 111-113.

Figure 4B:
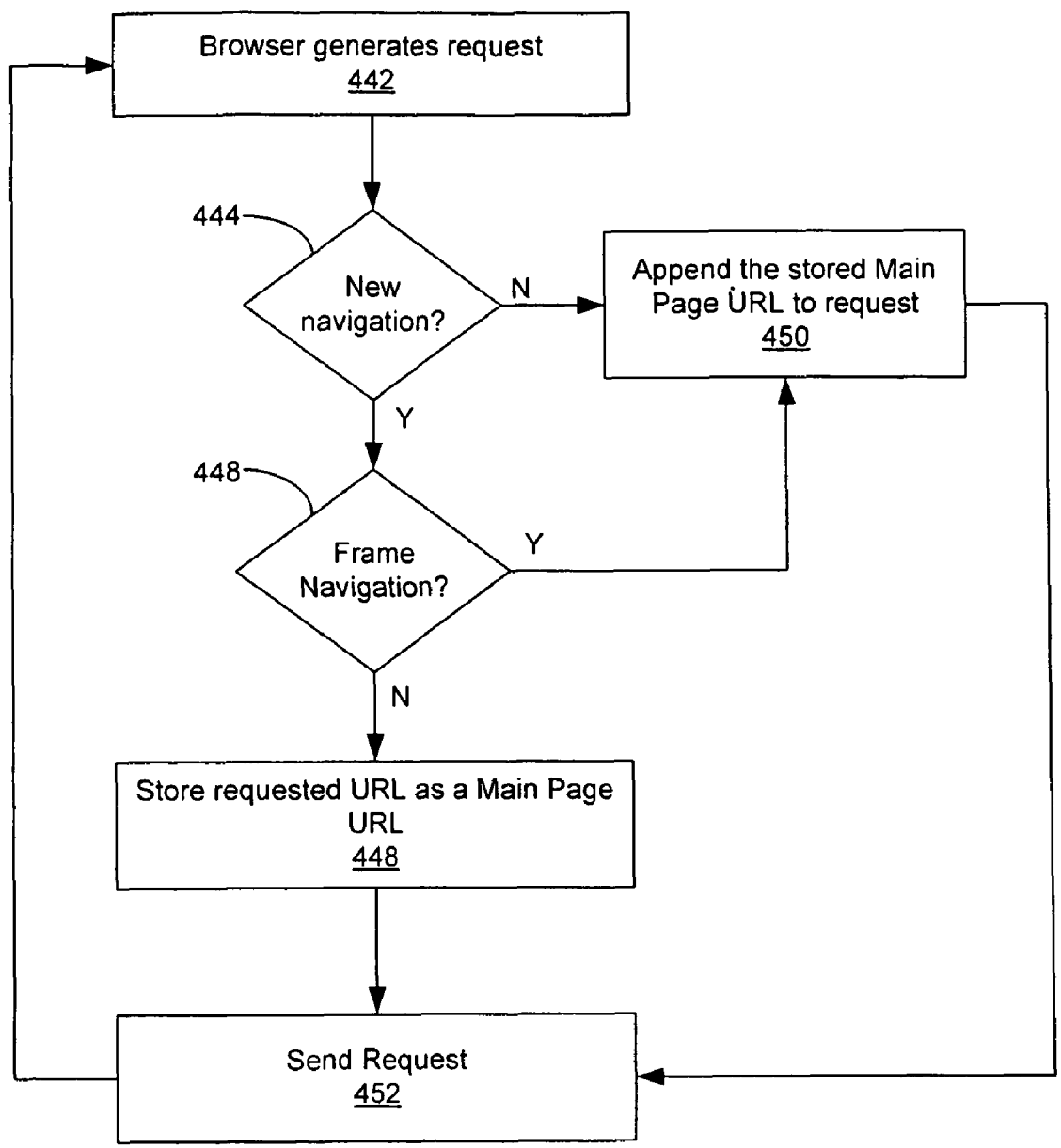
FIG. 4B is a flowchart showing a process that may be used to insure that the URL included in the page view field is the URL of a web page or other document that triggered the call for a delivered resource.

FIG. 4B is a flowchart of a process 440 that may be used for actions 405, 410, and 415 to insure that the URL included in the page view field is the URL of the web page or other document that initially triggered a request (i.e., it is the URL of the web page or document from which the URL for the information was obtained, either directly or indirectly). Browser 200 generates a request (442). A determination is made as to whether the request was generated as a result of a new user navigation (e.g., when the user types a URL into a navigation bar of browser 200 or clicks on a hyperlink) (444). If the request is a result of a new navigation (444), then, optionally, a determination is made as to whether the new navigation is a frame navigation (446).

A frame navigation is one in which a new web page is loaded into a frame of a currently displayed frame web page. When using HTML, an author can generate frame web pages that have two or more frames, or sub-windows, within the displayed web page. Each of the frames may be loaded with a different web page for display to the user. For example, within a web page, one frame might display a static banner, a second frame may display a navigation menu, and a third frame may display the main document that can be scrolled through or replaced by clicking on a hyperlink in the navigation menu contained in the second frame.

The source code of a frame web page contains instructions that direct the browser to split the display into two or more frames during rendering and to retrieve items (e.g., other web pages) for display in each frame. When processing the source code of a frame web page during rendering, the browser splits the display into multiple frames. For each frame, the browser then obtains the item that is to be displayed in the frame. If the item is a web page, the browser obtains the web page and begins rendering the web page in the appropriate frame. The user may then, for example, click on a hyperlink in the web page displayed in the frame or in another frame to cause a new web page or other resource to be displayed in either of the frames. This navigation is considered to be a frame navigation, since the new web page is loaded into one of the frames of the displayed web page.

Figure 4C:
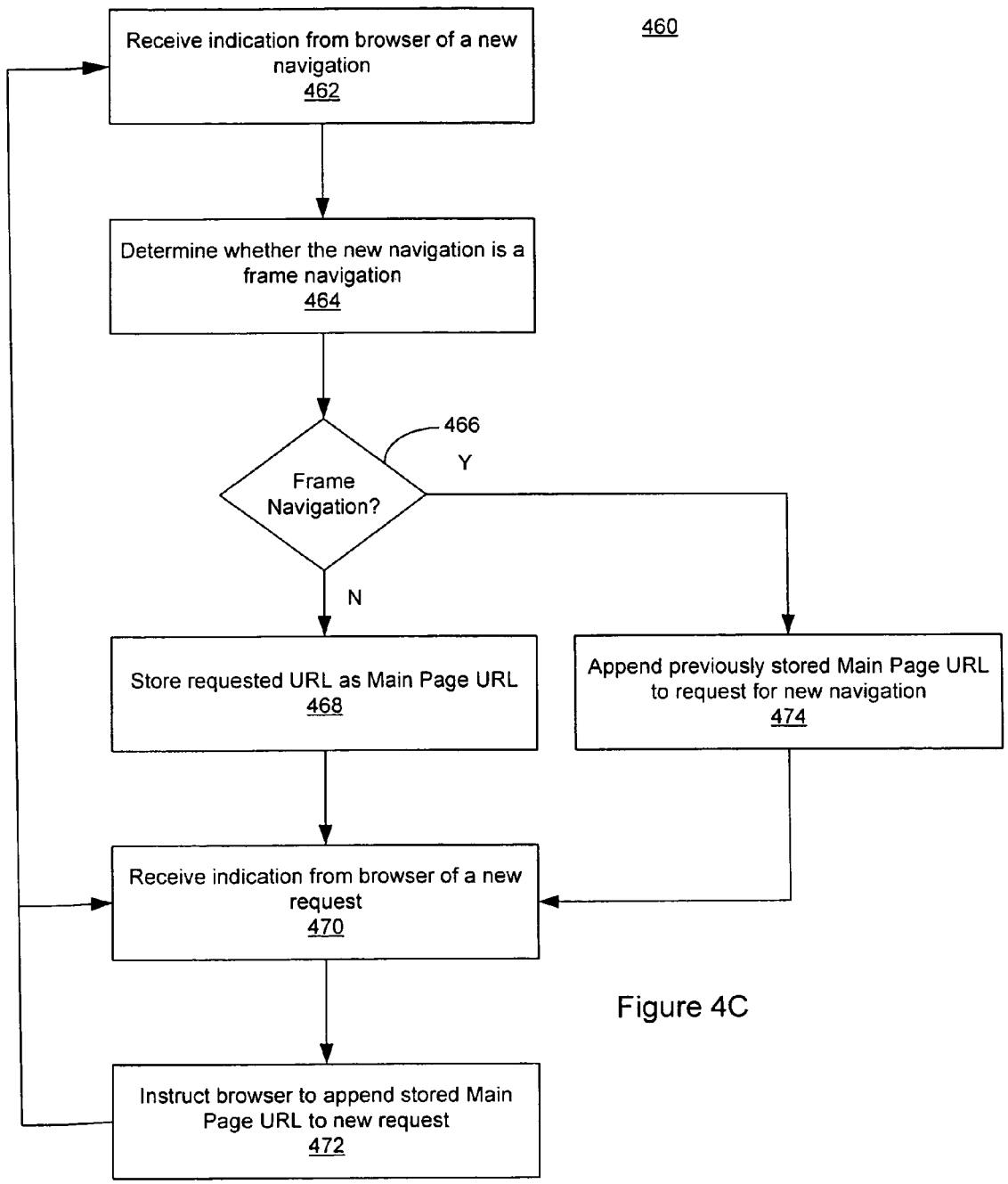
FIG. 4C is a flowchart of an alternative process that may be used to insure that the URL included in the page view field is the URL of the web page or other document that triggered the call for a delivered resource.
Figures 4D, 4E:
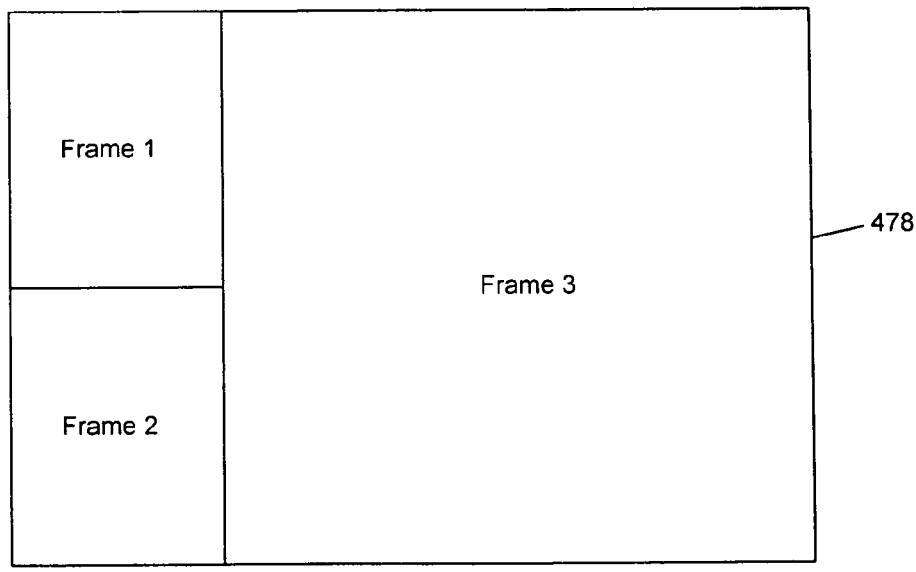
FIG. 4D shows exemplary HTML code for a frame webpage.
FIG. 4E is diagram illustrating the resulting frames for the source code shown in FIG. 4D.

As an example, FIG. 4D shows exemplary web page source code 476 that results in a frame web page 478, such as that shown in FIG. 4E. The source code instructs the browser to split the display into three frames, namely, Frame 1, Frame 2, and Frame 3. The source code also instructs the browser to request and render a first web page ("contents_of_frame1.html") into Frame 1, a second webpage ("contents_of_frame2.html") into Frame 2, and a third webpage ("contents_of frame3.html") into Frame 3. When the third webpage is displayed in Frame 3, the user may, for example, click on a hyperlink in the third webpage and a new webpage (corresponding to the hyperlink) is loaded into Frame 3. The user also may be able to click on a hyperlink in the second webpage loaded in Frame 2 and the new webpage (corresponding to the hyperlink) is loaded into Frame 3. These two instances are frame navigations. The user additionally may be able to type the URL of a new web page into a navigation bar of the browser, or click a hyperlink in one of the webpages, and the new web page is opened in the full display of the browser (i.e., it is not loaded into one of the frames, rather it is opened as its own webpage in the browser). Such a navigation is not a frame navigation.

As described above, in process 440, if the request is a result of a new navigation (444), then a determination is made as to whether the new navigation is a frame navigation (446). If the new navigation is not a frame navigation, then the URL requested in the request generated by the browser is stored as a Main Page URL (452) and the request is sent to the server (452). Subsequent requests that are not new navigations, or that are new navigations but are not frame navigations, have this stored Main Page URL appended to or otherwise included with them in the page view header.

This is illustrated by process 440 with respect to action 450. Thus, as shown, when the browser request is not a new navigation (444), the previously stored Main Page URL is appended to or otherwise included in the request in the page view header (450). Similarly, even if the request is a new navigation (444), if it also is a frame navigation (446), the previously stored Main Page URL is appended to or otherwise included in the request in the page view header (450) and the request is sent to the server (452).

In other implementations, the URL requested for a frame navigation may alternatively be stored as the Main Page URL. That is, a new navigation results in the requested URL being stored as the Main Page URL or otherwise used as a basis for page view header, regardless of whether or not the navigation is a frame navigation.

As an example of process 440 applied to web page 210, a user enters the URL for webpage 210 (i.e., "www.cnn.com") into a navigation bar of browser 200. Browser 200 generates a request as a result (442) (which will be sent from client computer 111 to, for example, server computer 132). This request is the result of a new navigation (444), that is not a frame navigation (446). Consequently, the URL "www.cnn.com" is stored as the Main Page URL (448). However, the request is sent to the server computer 132 without having www.cnn.com included within a page view header (452). The request is first received by proxy server 117. Proxy server 117 then forwards the request for webpage 210 to the server computer 132, receives the source code for webpage 210 from server computer 132, and forwards the source code for webpage 210 back to client computer 111 so that browser 200 can render webpage 210.

Browser 200 begins processing the source code and rendering webpage 210. As part of rendering webpage 210, browser generates requests for objects in webpage 210, such as graphics 212 and 216. For example, browser 210 begins to render graphic 212 before graphic 216. As a result, browser 210 generates a request for graphic 212 (442) (which will be sent from client computer 111 to, for example, server computer 131). This request is not the result of a new navigation (444) because it is being performed as part of the rendering. Consequently, the stored Main Page URL ("www.cnn.com") is appended to or otherwise included in the request in the page view header of the request or otherwise included within a request (450) that is sent to server computer 131 (452). The request is first received by proxy server 117, which may perform some processing as a result of receiving the request (further described below). Proxy server 117 then forwards the request for graphic 212 to the server computer 131, receives graphic 212 from server computer 131, and forwards graphic 212 back to client computer 111 so that browser 200 can display graphic 212.

Next, browser 210 begins rendering graphic 216. As with graphic 212, browser 210 generates a request for graphic 216 (442) (which will be sent to, for example, server computer 133). This request is not the result of a new navigation (444) because it is being performed as part of the rendering. Consequently, the stored Main Page URL ("www.cnn.com") is appended or otherwise included as the page view header of the request or otherwise included within a request (450) that is sent to server computer 133 (452). Again, the request is first received by proxy server 117, which may perform some processing as a result of receiving the request (further described below). Proxy server 117 then forwards the request for graphic 216 to the server computer 133, receives graphic 216 from server computer 133, and forwards graphic 216 back to client computer 111 so that browser 200 can display graphic 216.

Once web page 210 is rendered, if the user, for example, clicks on a hyperlink (e.g., one of the hyperlinks 226), then browser 200 generates a request (442). This request, however, is the result of a new navigation (444) and is not a frame navigation (446). Consequently, the URL pointed to by the hyperlink the user clicked on is stored as the Main Page URL (448) and the request is sent to the appropriate server computer without having a page view header appended thereto or otherwise included therewith (452).

FIG. 4C is a flowchart of an alternative process 460 that may be used for actions 405, 410, and 415 to insure that the URL included in the page view field is the URL of the web page or other document that caused the information to be requested. Process 460 is particularly suited to be implemented by a plug-in to browser 200 to provide browser 200 with the ability to append page view headers to requests as appropriate. In other words, in one implementation, browser 200 does not implement the functionality to append the page view header to requests. Rather, a plug-in to browser 200 implements the functionality to appropriately append or otherwise include the page view header. Process 460 is particularly suited to be performed by such a plug-in.

Accordingly, when there is a new navigation by a user, browser 200 provides an indication to the plug-in that a new navigation has occurred (462). The plug-in then queries browser 200 to determine whether the new navigation is a frame navigation (464). If the new navigation is not a frame navigation (466), then the URL requested in the new navigation is stored by the plug-in as the Main Page URL (468). Then, when the browser generates a request as part of rendering, the browser provides an indication to the plug-in (470), which then instructs browser 200 to append the stored Main Page URL in the request (472). The plug-in then waits for new indications of a new navigation, or a new request that is not a new navigation, and responds accordingly.

When the new navigation is a frame navigation (466), then the plug-in instructs browser 200 to append a previously stored Main Page URL to the request. Then, when the browser generates a request as part of rendering, the browser provides an indication to the plug-in (470), which then instructs browser 200 to append the stored Main Page URL to the request (472). In this case, the stored Main Page URL is still the previously stored Main Page URL because a new navigation that is not a frame navigation has not occurred. The plug-in then waits for new indications of a new navigation, or a new request that is not a new navigation, and responds accordingly.

As an example of process 460 applied to web page 210, a user enters the URL for webpage 210 (i.e., "www.cnn.com") into a navigation bar of browser 200. Browser 200 generates a request as a result (which will be sent from client computer 111 to, for example, server computer 132) and provides an indication to the plug-in of the new navigation, along with the URL of the new navigation (462). The plug-in then queries browser 200 to determine whether the new navigation is a frame navigation (464). This request is not a frame navigation (466) and, consequently, the URL "www.cnn.com" is stored by the plug-in as the Main Page URL (468). However, the request is sent to the server computer 132 without having www.cnn.com included within a page view header. The request is first received by proxy server 117, which then forwards the request for webpage 210 to the server computer 132, receives the source code for webpage 210 from server computer 132, and forwards the source code for webpage 210 back to client computer 111 so that browser 200 can render webpage 210.

Browser 200 begins processing the source code and rendering webpage 210. As part of rendering webpage 210, browser generates requests for objects in webpage 210, such as graphics 212 and 216. For example, browser 210 begins to render graphic 212 before graphic 216. As a result, browser 210 generates a request for graphic 212 (which will be sent from client computer 111 to, for example, server computer 132). Browser 200 provides an indication of the request to the plug-in (470), which then instructs browser 200 to append the stored Main Page URL (i.e., "www.cnn.com") to the request (472). Browser 200 appends the Main Page URL to the request as the page view header of the request or otherwise includes it within a request that is seat to server computer 131. The request is first received by proxy server 117, which may perform some processing as a result of receiving the request (further described below). Proxy server 117 then forwards the request for graphic 212 to the server computer 131, receives graphic 212 from server computer 131, and forwards graphic 212 back to client computer 111 so that browser 200 can display graphic 212.

Next, browser 210 begins rendering graphic 216. As with graphic 212, browser 210 generates a request for graphic 216 (which will be sent to, for example, server computer 133). Browser 200 provides an indication of the request to the plug-in (470), which then instructs browser 200 to append to or otherwise include with the request the stored Main Page URL (i.e., "www.cnn.com") (472). Browser 200 appends includes the Main Page URL to the request in the page view header and sends the request to server computer 133. The request is first received by proxy server 117. Proxy server 117 may perform some processing as a result of receiving the request (further described below). Proxy server 117 then forwards the request for graphic 216 to the server computer 133, receives graphic 216 from server computer 133, and forwards graphic 212 back to client computer 111 so that browser 200 can display graphic 216.

Once web page 210 is rendered, if the user, for example, clicks on a hyperlink (e.g., one of the hyperlinks 226), then browser 200 generates a request and provides an indication of a new navigation to the plug-in (462). The plug-in queries browser 200 to determine if this new navigation is a frame navigation (464), which it is not (466). Therefore, plug-in stores the URL corresponding to the hyperlink selected as the Main Page URL (468) and process 460 continues.

In processes 440 and 460, when a request is the result of a new navigation that is not a frame navigation (and, hence, the requested URL is stored as the Main Page URL), the above description indicates that a page view header will not be appended or otherwise included. However, as an alternative, it is possible, and in fact contemplated, that the requested URL may be appended to or otherwise be included with the request in the page view header.

Processes 440 and 460 insure that the URL of the web page whose rendering caused an object to be retrieved is included in the page view header of the request for the object. Thus, unlike implementations of the HTTP referrer, processes 440 and 460 can provide a page view (i.e., an understanding of what objects are part of a web page) to, for example, a proxy server. Having a page view is useful in a number of applications, such as those described below. Because of the HTTP referrer's inconsistent information, it was found to be unsuitable for at least these applications and it does not appear to have been designed for applications that use a page view of the objects being retrieved by a browser.

As described, proxy server processing may relate to the reporting of URLs visited by parentally controlled accounts. Some Internet Service Providers (ISPs) provide parents with the ability to create accounts that are parentally controlled, i.e., have certain permissions set by the parents. As part of the parental control service, an ISP may wish to provide an indication of the URLs visited by the parentally controlled account and report the URLs to a parental or supervisory account, for example, by sending an e-mail to the parental account with a list of the URLs visited; by presenting a dialog box to a user of the parental account with a list of the URLs; or by presenting a web page to the user of the parental account with a list of the URLs. The user of the parental or supervisory account, or of the parentally controlled account, may be a child, a parent or supervisor, or both.

The proxy server 117 may use the page view field to more accurately show which URLs were retrieved intentionally by the user of the parentally controlled account. With the page view field, proxy server 117 can determine that the requested URL was obtained from the web page when the web page was displayed to the user. To help prevent confusion on the part of the parents, proxy server 117 may exclude the URLs obtained from the web page. That is, to avoid misleading a parent with an indication, for example, that the user of the parentally controlled account intentionally visited a default web page and all of the objects (e.g., graphics) displayed, embedded, or otherwise called because of the default web page, the web page view may be used to distinguish or filter web pages called as a result of an accessed web page being rendered.

For example, if the user of the parentally controlled account retrieves the default web page at www.cnn.com/, proxy server 117 stores this URL when HTTP request 300 is received from, e.g., client computer 111. As web browser 200 is rendering web page 210, proxy server 117 also receives HTTP requests 310 and 320. Without the page view field, proxy server 117 may be unable to determine that the URLs in requests 310 and 320 are being requested as a result of web page 210 being rendered, thus proxy server 117 may store each URL and generate a reporting list for the parents that includes:

www.cnn.com/
i.a.cnn.net /cnn/.element/img/1.1/logo/logo.gif
spd.atdmt.com /b/AANYCVCSTVST/1CNN__1028__728×90.jpg While it is possible that the parents may be able to guess that the second URL resulted from the user's visit to the web page at www.cnn.com/ (because the URLs include similar domains, namely, cnn.com and cnn.net), they will be burdened to do so. Furthermore, it is likely difficult for the parents to determine that the third URL was requested as a result of the user visiting www.cnn.com/. Thus, the parents may falsely believe that the user intentionally visited the third URL, when in fact the URL is listed because the user visited www.cnn.com/. This may lead parents to believe their children are visiting many more sites than the children actually are, or visiting sites that the parents potentially may not approve of.

By using the page view header, however, proxy server 117 can determine that the second and third URLs were obtained from within web page 210 (at www.cnn.com/). As a result, proxy server may exclude these URLs from the list reported to the parents.

To differentiate between URLs retrieved when rendering a web page and URLs retrieved when a user selects a hyperlink in the web page, the page view header may have an additional data item that indicates whether the URL is one selected by the user or is one that is retrieved while rendering a web page. In such an implementation, proxy server 117 may exclude those URLs that are contained in a web page and retrieved as a result of the web page rendering, but include in the reporting list those URLs that are contained in a web page as hyperlinks and selected by the user. This may be useful because parents, for example, may be interested in the web pages the user of the parentally controlled account is intentionally visiting (e.g., by selecting a hyperlink or by typing a URL into the web browser 200). But at the same time, the parents may not want to know the URLs of the objects displayed in the intentionally visited web pages, or may be confused by those additional URLs being included, as described above. Thus, for example, it may be desirable to exclude the URL for graphic 212 from the list, but include the URL for a hyperlink 226 if the user selects the hyperlink.

Figure 5:
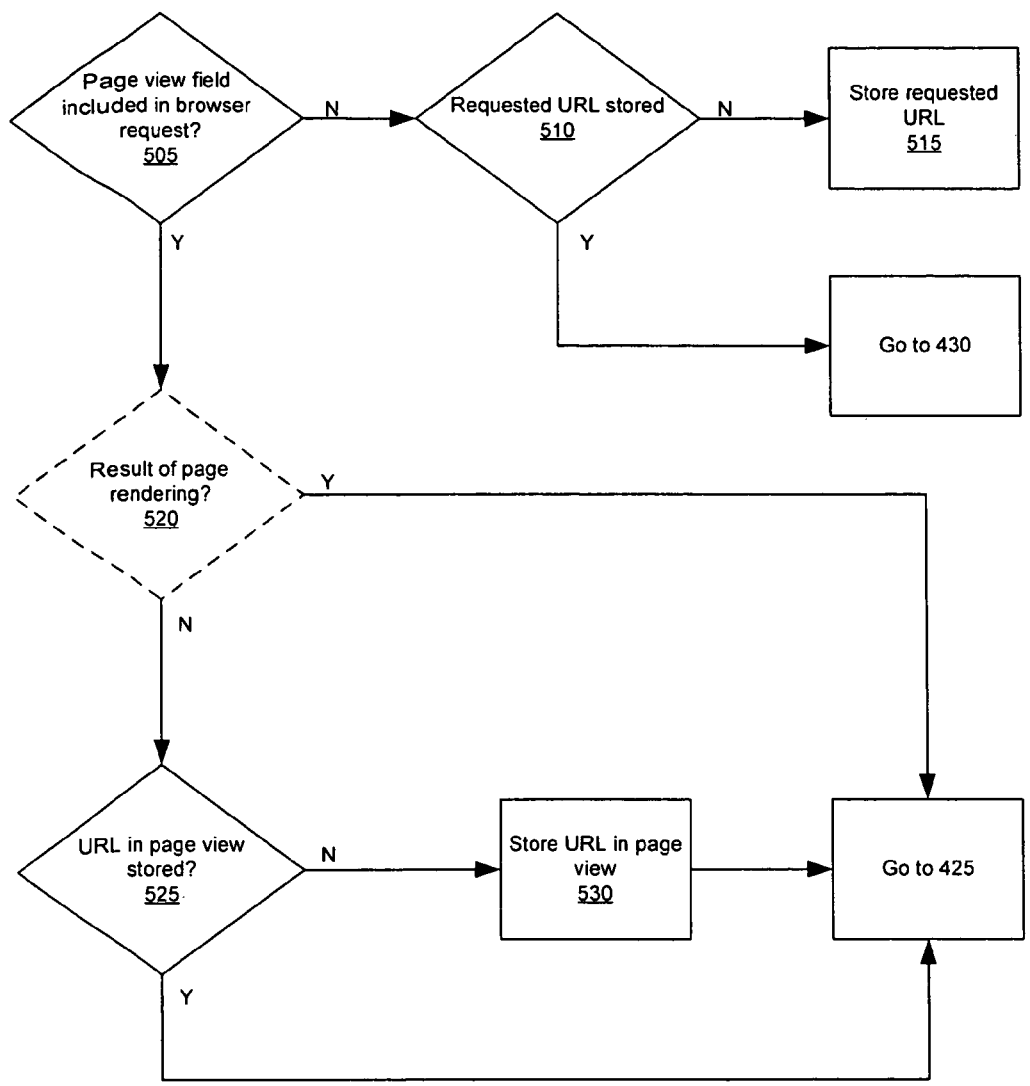
FIG. 5 is a flowchart that shows an implementation of proxy server processing.

Referring to FIG. 5, in such an application, the processing based on the page view header (420) may include determining if a page view field is included in the received request (505). If the page view field is not included in the request (505), then the requested URL is the one requested by the user (e.g., by clicking on a hyperlink or typing the URL into an address bar of the browser). Thus, if the page view field is not included in the request (505), the requested URL in the request is stored for reporting (515), if the URL has not been stored previously (510). If the requested URL has been stored previously (510), then proxy server 117 forwards the request (430).

If the page view field is included in the received request (505), a determination is made as to whether the URL contained in the data of the page view field has been stored for inclusion in the list (525). If not, the URL contained in the data of the page view field is stored (530) and proxy server 117 moves on to removing the page view field (425). If the URL in the data of the page view field has already been stored (525), then proxy server 117 moves on to removing the page view field (425).

Optionally, if the page view field has additional data indicating whether the URL was retrieved as a result of being user-selected selected or as a result of rendering a user-selected web page, then proxy server 117 may determine whether the request is a result of the page rendering (520) before determining if the URL in the data of the page view has previously been stored (525). That is, proxy server may determine whether the requested URL is being retrieved as a result of rendering or as a result of the user selecting a hyperlink for the requested URL (520). If the requested URL is being retrieved based on the user selecting a hyperlink (520), then proxy server 117 continues the previous processing by determining whether the URL contained in the data of the page view field has been stored for inclusion in the list (525). If, on the other hand, the requested URL is being retrieved as a result of rendering (520), then proxy server 117 moves on to removing the page view field (425).

Another implementation (an example of which is described with respect to FIGS. 6A and 6B) involves allowing parentally controlled accounts to access lower level web pages of web pages the account has been given permission to access. As part of a parental control service, an ISP may block particular web pages from being visited by parentally controlled accounts. The ISP may give the user of the parentally controlled account (typically a child or young teen) the ability to request from the parents that certain web pages be unlocked, i.e., that the parentally controlled account be granted permission to view the otherwise blocked web pages.

Proxy server 117 may be used to provide the blocking service. Specifically, proxy server 117 may receive an HTTP request and compare the requested URL to a list of blocked URLs for the parentally controlled account. When parents grant permission to visit a certain web page, the web page is removed from the list of blocked sites. Alternatively, a list of excluded sites may be kept for parentally controlled accounts generally, and each parentally controlled account may have a specific list of web pages for which permission has been granted.

At times, a parent may want to grant permission for the account to be able to access a top-level web page and all of the lower level web pages hyperlinked to in the top-level web page. For example, a parent may wish to give the account access to the web page at "www.cnn.com/" and the web pages connected thereto by hyperlinks 226. Yet, it would be burdensome to the parent to indicate every web page that they wish to give permission to visit. At the same time, without the URL for the web page being explicitly designated by the parent, it may be difficult for proxy server 117 to determine if the lower level web pages should be permitted based simply on reviewing the URL for the lower level web page included in the request. That is, if the lower level web pages are typically blocked, it may not be possible for proxy server 117 to determine that they should now be allowed simply by reviewing the URL in the request for the lower level web page. This is particularly the case if the lower level web page does not share the same domain as the top-level web page.

Using the page view field, however, proxy server 117 can determine that the URL for the lower level web page was obtained from a permitted page and, therefore, should be permitted also. Thus, by comparing the URL in the data of the page view request to the list of allowed sites or to the list of excluded sites (depending on the implementation), proxy server 117 can determine whether the object pointed to by the requested URL should be retrieved and forwarded to the client computer.

Figure 6A:
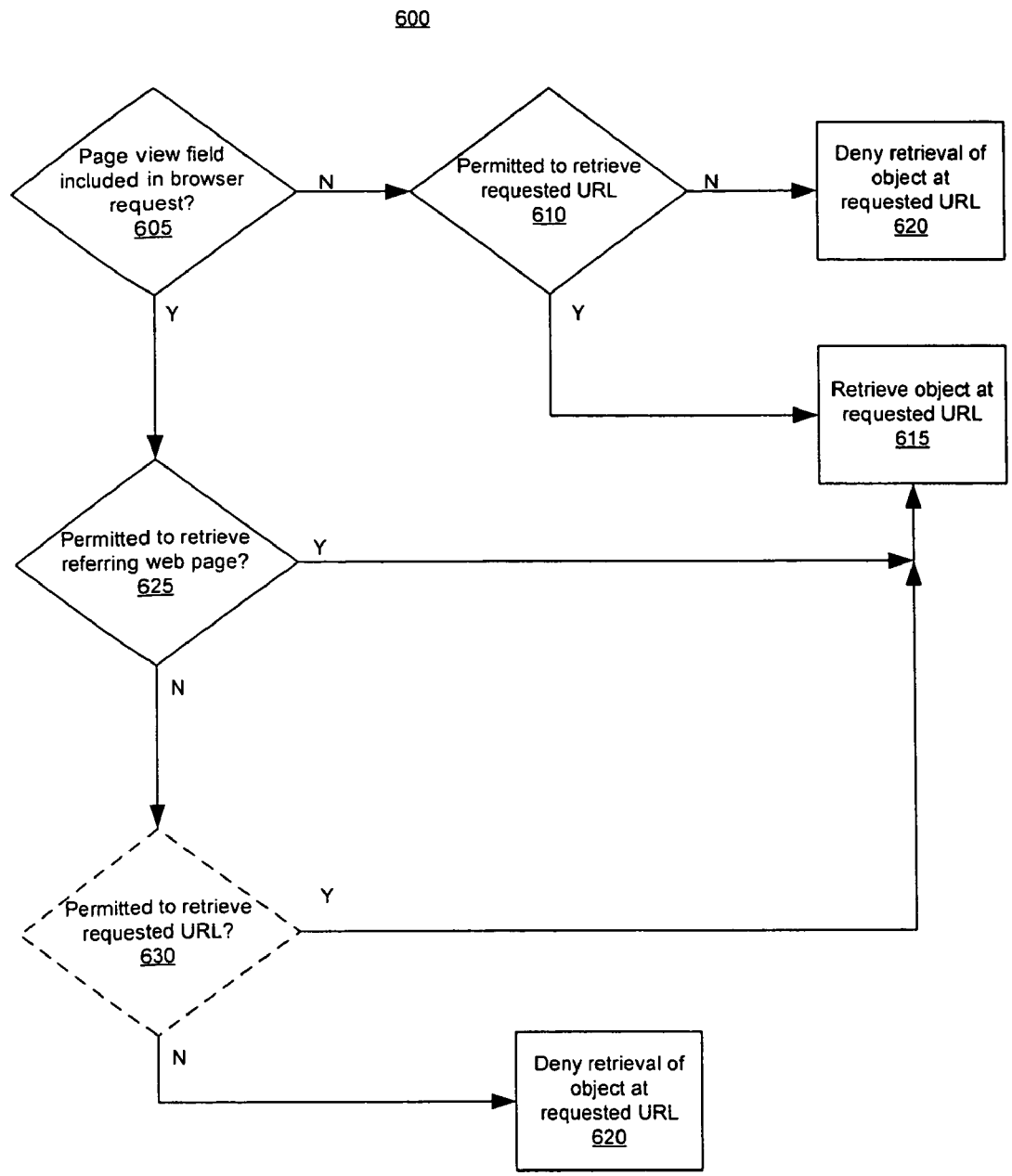
FIG. 6A is a flowchart that shows an implementation of proxy server processing.

Referring to FIG. 6A, in one example of such an application, the processing based on the page view header (420) may include determining if a page view field is included in the received request (605). If the page view field is not included in the request, proxy server 117 determines whether the parentally controlled account is permitted to retrieve the item at the requested URL (610). If so, proxy server 117 obtains the item at the requested URL and forwards the item to the client computer (615). Otherwise, proxy server 117 does not obtain the item and may optionally inform client computer that the parentally controlled account is not permitted to access the item (620).

If the page view field is included, a determination is made as to whether the parentally controlled account is permitted to access the item at the URL contained in the data of the page view field (i.e., the referring page) (625). If so, then the item at the requested URL is obtained and forwarded to the client computer (615). If not, proxy server 117 optionally may make a separate determination as to whether the parentally controlled account can access the requested URL (630). This may be useful in situations in which a web page the account does not have permission to access contains a hyperlink to a web page the account does have permission to access. If proxy server 117 determines that the parentally controlled account can retrieve the URL, proxy server 117 obtains the item at the requested URL and forwards the item to the client computer (615). Otherwise, proxy server 117 does not obtain the item and may optionally inform client computer that the parentally controlled account is not permitted to access the item (620).

Optionally, proxy server 117 may store the requested URLs and their relationship among each other and determine from this relationship whether access to the requested URL should be granted. The web pages linked to by a permitted web page may themselves link to other web pages, all of which constitute the same site. Parents may want to give permission to the parentally controlled account to access the entire site. For example, a parentally controlled account may be given permission to visit the cnn.com website. The cnn.com website includes web page 210 and the web pages connected to web page 210 by hyperlinks 226. The web pages connected to web page 210 also may have hyperlinks connecting to other web pages on the cnn.com web site. By storing which URLs are contained in which web pages, at least during the current session, proxy server 117 may appropriately provide access to the lower level web pages.

Figure 6B:
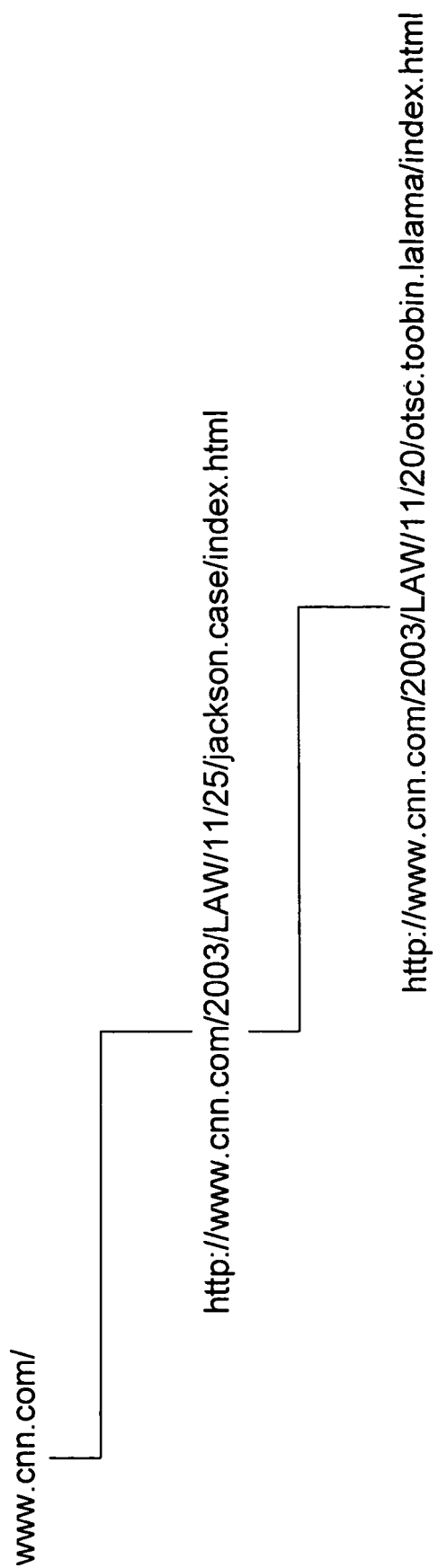
FIG. 6B is a diagram that shows a relationship between multiple URLs for web pages.

Referring to FIG. 6B, for example, the web page 210 at URL 640 (www.cnn.com/) contains a hyperlink 226a for the webpage (not shown) at URL 645 (http://www.cnn.com/2003/LAW/11/25/jackson.case/index.html), which contains a hyperlink (not shown) for the web page (not shown) at URL 650 (http://www.cnn.com/2003/LAW/11/20/otsc.toobin.la-lama/index.html). If the parents give permission to access the web page at URL 640 and the parentally controlled account accesses the web page at URL 645 via hyperlink 226a, then the data in the page view field will contain URL 640 and, consequently, proxy server 117 will retrieve the web page at URL 645. If the account, however, attempts to access the web page at URL 650 via a hyperlink on the web page at URL 645, then the data in the page view field will contain URL 645, which has not been specifically permitted. Thus, proxy server 117 may not permit access to the web page at URL 650. However, if proxy server 117 stored the information that URL 645 was obtained from the web page at URL 640, and that the web page at URL 640 is permitted, proxy server 117 may permit access to the web page at URL 650 because the parents gave permission for access to the website at cnn.com and the web page at URL 650 is connected to the top-level page of the website cnn.com.

Other applications also may benefit from tracking the relationship among related URLs. For example, the application to reporting visited web pages may track the relationships between related URLs so that only the top-level web page (or web page manually entered) is reported. That is, the web pages whose URLs are obtained from within a web page (whether retrieved as a result of rendering or as a result of the user selecting a hyperlink) may be excluded from the report to the parental account. Alternatively, a pre-selected default or user-designated number of lower level web pages viewed may be reported with the top-level web page.

Alternatively, proxy server 117 may allow a parentally controlled account to access web pages at URLs located on a web page already retrieved, i.e., it is assumed that if the parentally controlled account has permission for a web page, then it has permission for lower level web pages or other objects hyperlinked to the permitted web page. For example, because the web page for URL 645 was already retrieved (because it was determined to be permitted), when the parentally controlled account requests the web page at URL 650 by a hyperlink in the retrieved web page at URL 645, proxy server 117 observes that URL 645 is contained in the data of the page view field and, consequently, obtains the web page at URL 650 because proxy server 117 has already obtained the web page at URL 645.

Another application (an example of which is described with respect to FIG. 7) entails accurately tracking popular web pages. Some ISPs provide its members with a list of the web pages that are visited the most by the members of the ISP over a particular period of time. The ISP tracks which web pages are being requested by the members of the ISP, ranks the requested web pages based on the number of requests received in a certain time, and displays a certain number (e.g., 5) of the highest ranking web sites to the users. The ISP tracks the web pages based on the URLs requested by its users. To do so, for example, when client computer 111 sends request 300 for the web page at www.cnn.com/, proxy server 117 stores the URL requested in request 300 (i.e., www.cnn.com/), along with a count of one (assuming client computer 111 is the first computer to request the URL). As other client computers request the URL www.cnn.com/ during a certain period of time, proxy server 117 increments the count accordingly. Proxy server 117 can increment the count for each time the URL is requested, or for each time a unique client computer requests the URL. Proxy server 117 can track whether a particular client computer has previously requested the web page by, for example, noting the IP or other address (or logon information, such as screen name) of the client computers that have requested the web page. After the certain period of time, proxy server 117 ranks the count of the URL www.cnn.com with other URLs requested during that period and displays the top (e.g., 5) requested URLs during the time period.

To accurately track which web pages the ISP's members are actually requesting (and hence, which ones are popular, i.e., requested by the users the most over a certain period of time), it is advantageous for the ISP to distinguish web pages the members request from, e.g., the objects requested when a web page is rendered. For example, when client computer 111 sends request 300 for web page 210, client computer 111 also will send requests 310 and 320 when web page 210 renders. However, tracking the URLs in requests 310 and 320 does not accurately reflect what is popular among the members of the ISP because members of the ISP have not specifically requested these objects themselves, rather they were requested as part of the web page at www.cnn.com/. Thus, to report these URLs as popular may confuse members into thinking the objects (e.g., graphic 212) are what is popular, instead of the web page at www.cnn.com/. Further, when only a particular number of popular web pages are displayed, these objects may be ranked higher than web pages users intentionally requested, thereby preventing web pages that are popular from being displayed to the members.

Figure 7:
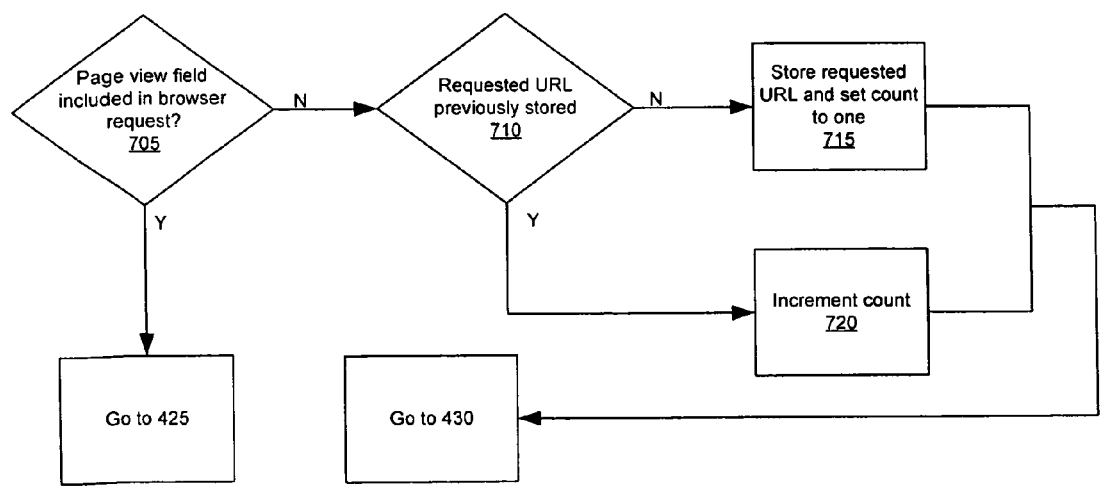
FIG. 7 is a flowchart that shows an implementation of proxy server processing.

Referring to FIG. 7, in one example of such an application, the processing based on the page view header (420) may include determining if a page view field is included in the received request (705). If not, the URL is stored (if not previously (710)) and a count is set to one (715). If the URL has been previously stored, the count is incremented by one (720). If proxy server 117 tracks unique requests, then proxy server 117 may determine whether this is a unique request before incrementing the count. Proxy server 117 then moves on to forwarding the request (430).

If a page view field is included in the request, the URL is not stored or the counter associated with the URL is not incremented Proxy server 117 then moves on to removing the page view field (425).

Among other features, FIGS. 1-7 describe appending tracking information to requests for resources that are requested as a consequence of their relationship to a web page or other resource explicitly selected by a user and, thus, which are only indirectly selected by the user. Alternatively, or additionally, the web page or other resource explicitly selected by the user may be identified as such in the request for the web page or other resource, which may allow the web page or resource to be differentiated from web pages or other resources that are requested as a consequence of their indirect selection. Moreover, a log of web pages or other resources explicitly selected by a user may be maintained at the client and later reference by a local processor or communicated to a host process seeking to differentiate directly and indirectly selected web pages or other resources. Such communications may be made in a communication separate from requests for resources. Implementations of such techniques are described with respect to FIGS. 8 and 9.

Figure 8:
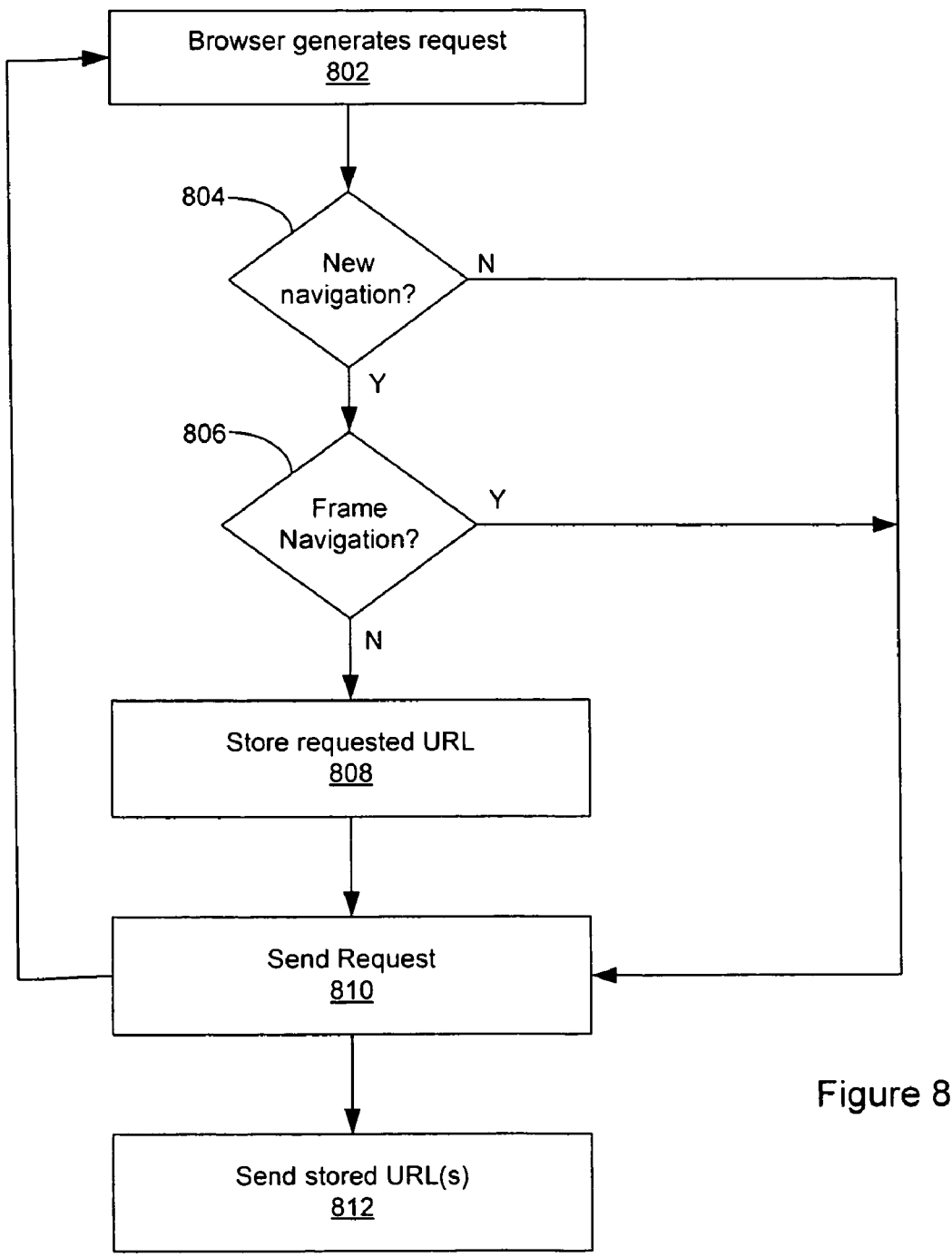
FIG. 8 illustrates a flow chart of a process that may alternatively be used for applications in which it is desirable to track the URLs intentionally selected by a user.

FIG. 8 illustrates a flow chart of a process 800 that may alternatively be used for applications in which it is desirable to track the URLs explicitly selected by a user, such as tracking popular web pages explicitly selected by users or tracking which URLs were selected explicitly and thus retrieved intentionally by the user of, for example, a parentally controlled account. In general, in this implementation, a communication separate from the requests is sent to the proxy server, and includes one or more URLs that correspond to new navigations.

Specifically, browser 200 generates a request (802) and a determination is made as to whether the request was generated as a result of a new user navigation (e.g., when the user types a URL into a navigation bar of browser 200 or clicks on a hyperlink) (804). If the request is not a result of a new navigation, then the request is sent to the server (812).

If the request is a result of a new navigation (804), then, optionally, a determination is made as to whether the new navigation is a frame navigation (806). If the new navigation is a frame navigation (806), then the request is sent to the server (812). If the new navigation is not a frame navigation (804), the URL requested in the request is stored (808) and the request is sent to the server (812). In other implementations, action 806 may be omitted such that URLs corresponding to new navigations are stored, regardless of whether they are a frame navigation or not.

The stored URL is then sent to the proxy server in a communication separate from the request (812). The URL may be sent once it is stored (that is, it may be sent immediately after it is store, at substantially the same time as the request), or the URL may be stored for a period of time before being sent. Alternatively, or additionally, one or more URLs for new navigations may be stored, and collectively sent to the proxy server. In other words, actions 802 through 810 may be performed repeatedly such that there are multiple, stored URLs. The multiple, stored URLs may then be sent as a group to the proxy server in a communication separate from a request (or, in another implementation, as part of a request).

Because the stored URLs are those that correspond to intentional navigations of a user, the proxy server can obtain a list of those web pages (or other resources) that the user intentionally requests. This may allow for a more accurate portrayal of the web pages requested in a parental controls application or a more accurate portrayal of popular web pages in a popular webpage application.

As an example of process 800 applied to web page 210, a user enters the URL for webpage 210 (i.e., "www.cnn.com") into a navigation bar of browser 200. Browser 200 generates a request as a result (802) (which will be sent from client computer 111 to, for example, server computer 132). This request is the result of a new navigation (804), that is not a frame navigation (806). Consequently, the URL "www.cnn.com" is stored (808). The request is sent to the server computer 132 (810). The request is first received by proxy server 117. Proxy server 117 then forwards the request for webpage 210 to the server computer 132, receives the source code for webpage 210 from server computer 132, and forwards the source code for webpage 210 back to client computer 111 so that browser 200 can render webpage 210.

An additional communication is sent by browser 200 to proxy server 117, for example, at substantially the same time as the request (812). This additional communication includes the stored URL for webpage 210 (i.e., www.cnn.com). Proxy server 117 receives the communication and uses the included URL, for example, to generate a list of websites visited for a parental control application, or to determine popular websites for a popular website application.

Browser 200 begins processing the source code and rendering webpage 210. As part of rendering webpage 210, browser generates requests for objects in webpage 210, such as graphics 212 and 216. For example, browser 210 begins to render graphic 212 before graphic 216. As a result, browser 210 generates a request for graphic 212 (802) (which will be sent from client computer 111 to, for example, server computer 131). This request is not the result of a new navigation (804) because it is being performed as part of the rendering. Consequently, the request is sent to server computer 131 (810). The request is received by proxy server 117, which then forwards the request for graphic 212 to the server computer 131, receives graphic 212 from server computer 131, and forwards graphic 212 back to client computer 111 so that browser 200 can display graphic 212.

Next, browser 210 begins rendering graphic 216. As with graphic 212, browser 210 generates a request for graphic 216 (802) (which will be sent to, for example, server computer 133). This request is not the result of a new navigation (804) because it is being performed as part of the rendering. Consequently, the request is sent to server computer 133 (810). Again, the request is first received by proxy server 117, which then forwards the request for graphic 216 to the server computer 133, receives graphic 216 from server computer 133, and forwards graphic 216 back to client computer 111 so that browser 200 can display graphic 216.

Once web page 210 is rendered, if the user, for example, clicks on a hyperlink (e.g., one of the hyperlinks 226), then browser 200 generates a request (802). This request, however, is the result of a new navigation (804) and is not a frame navigation (806). Consequently, the URL pointed to by the hyperlink the user clicked on is stored (808) and the request is sent to the appropriate server computer (810).

An additional communication is sent by browser 200 to proxy server 117, for example, at substantially the same time as the request (812). This additional communication includes the stored URL pointed to by the hyperlink. Proxy server 117 receives the communication and uses the included URL, for example, to generate a list of websites visited for a parental control application, or to determine popular websites for a popular website application.

As described above, in other implementations, the stored URLs alternatively may have been sent individually at a time period after the corresponding request was sent, or may have been sent as a group in a communication separate from a request (or as part of a request).

Figure 9:
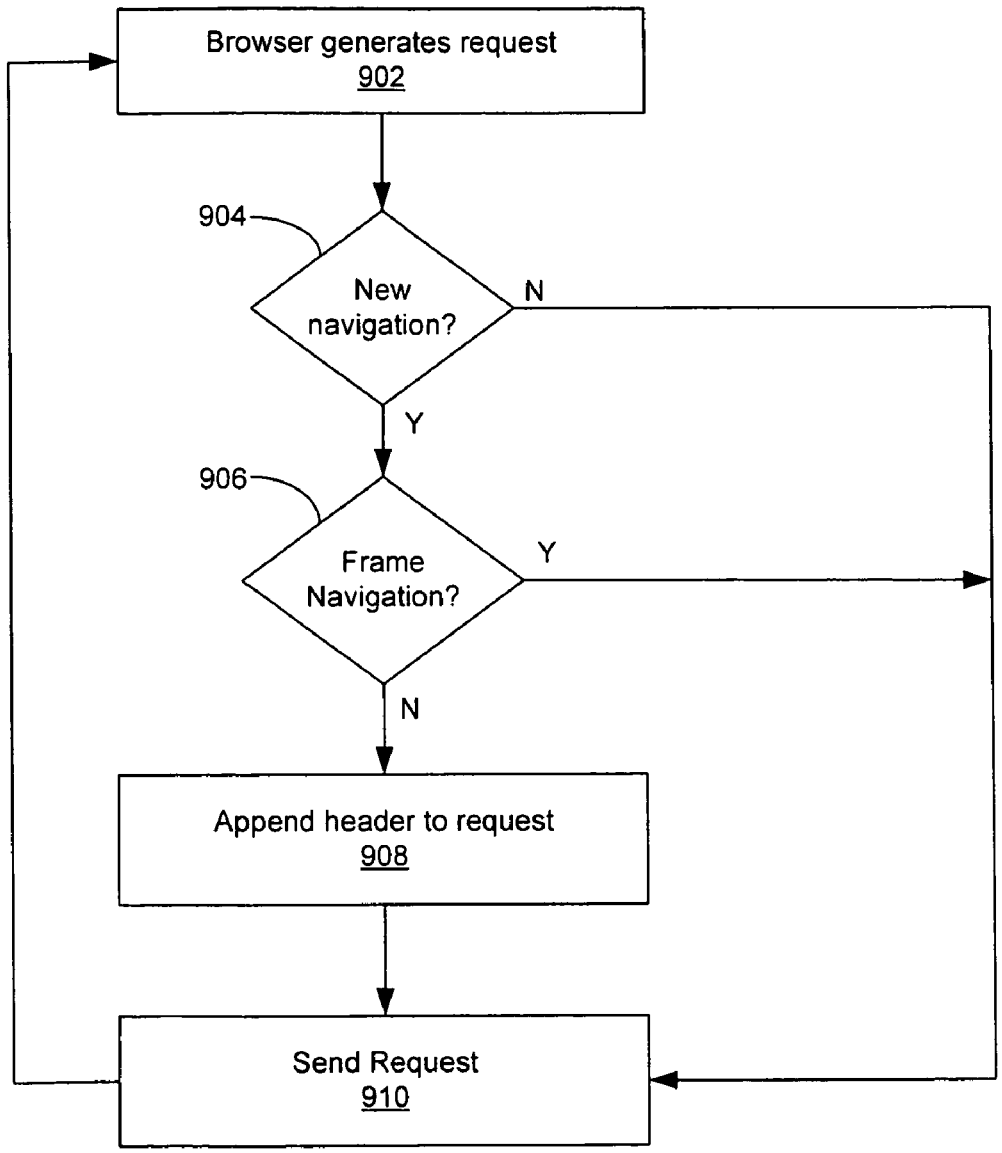
FIG. 9 illustrates a flow chart of another process that may alternatively be used for applications in which it is desirable to track the URLs intentionally selected by a user.

FIG. 9 illustrates a flow chart of another process 900 that may alternatively be used for applications in which it is desirable to track the URLs explicitly selected by a user, such as tracking popular web pages or tracking which URLs were explicitly selected and thus retrieved intentionally by, for example, the user of a parentally controlled account. In general, in this implementation, a header is appended or otherwise included in the requests that correspond to new navigations, or new navigations that are not frame navigations, but not included in other requests. The header indicates that the request corresponds to a new navigation, or a new navigation that is not a frame navigation. The header may have the same form as the page view header described above, or may have a different form that simply indicates that the URL in the request is the result of a new navigation, or a new navigation that is not a frame navigation. This header may be referred to as a navigation header.

Specifically, browser 200 generates a request (902) and a determination is made as to whether the request was generated as a result of a new user navigation (e.g., when the user types a URL into a navigation bar of browser 200 or clicks on a hyperlink) (904). If the request is not a result of a new navigation, then the request is sent to the server (910).

If the request is a result of a new navigation (904), then, optionally, a determination is made as to whether the new navigation is a frame navigation (906). If the new navigation is a frame navigation (906), then the request is sent to the server (910). If the new navigation is a frame navigation (904), then a navigation header is appended or otherwise included in the request (908) and the request is sent to the server (910). The navigation header indicates that the URL in the request is the result of a new navigation that is not a frame navigation. In other implementations, action 906 may be omitted such that the navigation header is appended to requests corresponding to new navigations, regardless of whether the navigations are frame navigations or not.

Through a process such as process 900, the requests for URLs intentionally navigated to by a user include a navigation header indicating that the request is a result of a user navigation. Accordingly, the proxy server can store a list of those web pages (or other resources) that the user intentionally requests. This may allow for a more accurate portrayal of the web pages requested in a parental controls application or a more accurate portrayal of popular web pages in a popular webpage application.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, while the processing based on the page view field has been described as being performed at a proxy server, the processing may be performed at other locations, such as the server computer that includes the requested object. Also, while preventing the reporting of certain URLS has been described as not storing the URLs depending on the page view field, an alternative implementation may include storing the request URLs and the URLs in the page view field, and then filtering the requested URLs by the stored URLs from the page view field such URLs for objects in a web page or other URLs not intentionally requested by the user are not reported. Also, while appending has been described as being used to incorporate the page view header, other manners may be used to include it in a request. In addition, while URLs have been described as being used as identifiers, other types of identifiers of webpages or other resources may be used. Accordingly, other implementations are within the scope of the following claims.

What is claimed is:

1. A method comprising:
    determining, via a client, whether a user has explicitly requested, over the Internet, a first resource from an HTTP server, wherein a uniform resource locator indicates a location of the first resource on a network, the uniform resource locator including a domain name section, a directory section, and a filename section;
    wherein the determining includes at least one of: detecting that the user has clicked on a hyperlink and detecting that the user has typed a location of the first resource into a navigation bar of a browser;
    generating, via the client, an HTTP request for the first resource based on the uniform resource locator, wherein generating the request based on the uniform resource locator comprises including at least the directory section and the filename section of the uniform resource locator in a first field of the HTTP request;
    only if the determination indicates the user explicitly requested the first resource:
    appending, via the client, to the generated HTTP request, an indication that the user explicitly requested the first resource, the indication being included in a second field of the HTTP request;
    sending, via the client, the request for the first resource to a server computer, wherein the server computer is configured to determine which resources the user intentionally requested based on information in the second field of the HTTP request;
    receiving the first resource from the server computer: and
    generating, via the client, a request for a second resource not explicitly requested by the user, wherein a second field of the request for the second resource identifies at least the domain name of the first resource, and wherein the request for the second resource does not include an indication that the user explicitly requested the second resource; and
    sending the request for the second resource.

2. The method of claim 1 wherein the server computer is a proxy server.

3. The method of claim 1 further comprising:
    detecting that the user has explicitly requested a third resource;
    generating an HTTP request for the third resource, the request for the third resource including an indication, in the second field of the HTTP request for the third resource, that the user explicitly requested the third resource;
    sending the request for the third resource to a server computer;
    receiving the third resource from the server computer; and
    rendering the third resource.

4. The method of claim 1 wherein the first resource is a web page.

5. The method of claim 1 wherein the indication that the user explicitly requested the first resource includes an HTTP header.

6. The method of claim 1 wherein the first resource comprises at least one of a multimedia element, a text file, a video file, an audio file, and an executable file.

7. A non-transitory computer-useable storage medium storing a computer program, the computer program comprising instructions for causing a computer to perform the following operations:
- determine, via a client, whether a user has explicitly requested, over the Internet, a first resource from an HTTP server, wherein a uniform resource locator indicates a location of the first resource on a network, the uniform resource locator including a domain name section, a directory section, and a filename section;
- wherein the determining includes at least one of: detecting that the user has clicked on a hyperlink and detecting that the user has typed a location of the first resource into a navigation bar of a browser;
- generate, via a client, an HTTP request for the first resource based on the uniform resource locator, wherein to generate the request based on the uniform resource locator, the program further comprises instructions for causing a computer to include at least the directory section and the filename section of the uniform resource locator in a first field of the HTTP request;
- only if the determination indicates the user explicitly requested the first resource, append, via the client, to the generated HTTP request an indication that the user explicitly requested the first resource, the indication being included in a second field of the HTTP request;
- send, via the client, the request for the first resource to a server computer, wherein the server computer is configured to determine which resources the user intentionally requested based on information in the second field of the HTTP request;
- receive the first resource from the server computer; and
- render the first resource, wherein rendering the first resource includes:
  - generating, via the client, a request for a second resource not explicitly requested by the user, wherein a second field of the request for the second resource identifies at least the domain name of the first resource, and wherein the request for the second resource does not include an indication that the user explicitly requested the second resource; and
  - sending the request for the second resource.

8. The medium of claim 7 wherein the server computer is a proxy server.

9. The medium of claim 7 wherein the computer program further comprises instructions for causing the computer to perform the following operations:
- detect that the user has explicitly requested a third resource;
- store a domain name of the third resource in the storage medium;
- generate a request for the third resource, the request for the third resource including an indication that the user explicitly requested the third resource;
- send the request for the third resource to a server computer;
- receive the third resource from the server computer; and
- render the third resource, including generating in a fourth HTTP request for a fourth resource used in rendering the third resource, wherein the fourth resource is not explicitly requested by the user and the fourth HTTP request includes at least the domain name of the third resource in the second field.

10. The medium of claim 7 wherein the first resource is a web page.

11. The medium of claim 7 wherein the indication that the user explicitly requested the first resource includes an HTTP header.

12. The medium of claim 7 wherein the first resource comprises at least one of a multimedia element, a text file, a video file, an audio file, and an executable file.

13. A computer-implemented method comprising:
- determining, via a processor, whether a user intentionally requests a web object by clicking on a hyperlink, wherein a uniform resource locator indicates a location of the web object on a network, wherein the determining includes at least one of: detecting that the user has clicked on a hyperlink and detecting that the user has typed a location of the first resource into a navigation bar of a browser;
- generating an HTTP request for the web object based on the uniform resource locator of the website;
- only when the request is intentional, appending, to the generated HTTP request, an indication that the user explicitly requested the web object, the indication being included in a second field of the HTTP request;
- when the request is unintentional, including at least a domain name in the second field of the HTTP request, wherein the domain name corresponds to a website intentionally requested by the user, wherein the unintentional request is made in association with rendering the website; and
- tracking, via a server computer, which web objects the user intentionally requests based on the second field of HTTP request.

14. The method of claim 13, wherein the tracking comprises:
- receiving, on a server computer, a plurality of HTTP requests;
- for each HTTP request, retrieving the information in the second field of the HTTP request; and
- storing information regarding at least the domain of the requested web object when the second field of indicates the user intentionally requested the web object.

15. The method of claim 13, wherein the second field indicates an intentional request when the second field contains information other than a domain name.

16. The method of claim 13, wherein the second field indicates an intentional request when the second field is empty.

17. The method of claim 13, wherein the second field indicates an unintentional request when it contains a second domain name that is different from the domain name associated with the web object, wherein the second domain name is associated with the website that was intentionally requested.

18. The method of claim 13 wherein the web object comprises at least one of a multimedia element, a text file, a video file, an audio file, and an executable file.

* * * * *